(12) United States Patent
Rutter, Jr. et al.

(10) Patent No.: US 8,859,673 B2
(45) Date of Patent: Oct. 14, 2014

(54) PROCESSABLE INORGANIC AND ORGANIC POLYMER FORMULATIONS, METHODS OF PRODUCTION AND USES THEREOF

(75) Inventors: Edward Rutter, Jr., Pleasanton, CA (US); Ahila Krishnamoorthy, Santa Clara, CA (US); Joseph Kennedy, San Jose, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 12/866,568

(22) PCT Filed: Feb. 20, 2009

(86) PCT No.: PCT/US2009/034655
§ 371 (c)(1),
(2), (4) Date: Nov. 10, 2010

(87) PCT Pub. No.: WO2009/108574
PCT Pub. Date: Sep. 3, 2009

(65) Prior Publication Data
US 2011/0054119 A1    Mar. 3, 2011

Related U.S. Application Data

(60) Provisional application No. 61/031,328, filed on Feb. 25, 2008.

(51) Int. Cl.
*C08L 83/06* (2006.01)
*C08L 29/00* (2006.01)
(Continued)

(52) U.S. Cl.
CPC ........... *C08K 5/3445* (2013.01); *C08J 2383/04* (2013.01); *C09D 183/04* (2013.01); *C08G 77/045* (2013.01); *C08J 5/18* (2013.01); *C08L 61/06* (2013.01); *C08J 2361/04* (2013.01)
USPC ......... 524/588; 525/534; 525/480; 427/372.2

(58) Field of Classification Search
None
See application file for complete search history.

(56) References Cited

U.S. PATENT DOCUMENTS 2,986,549 A   5/1961   McLoughlin
3,547,766 A   12/1970  Chu
(Continued)

FOREIGN PATENT DOCUMENTS

EP   1422566 A1   5/2004
EP   1598702 A1   11/2005
(Continued)

OTHER PUBLICATIONS

Sigma-Aldrich, Product Specification, Alphazurine A—Die Content 40%, one page downloaded from Sigma-aldrich.com on Feb. 22, 2014, one page.

(Continued)

*Primary Examiner* — Robert S Loewe
(74) *Attorney, Agent, or Firm* — Faegre Baker Daniels LLP

(57) ABSTRACT

Polymer formulations are disclosed and described herein that comprise: at least one polymer comprising at least one hydroxy functional group, at least one acid source, and at least one acid-activated crosslinker that reacts with the polymer. In contemplated embodiments, these polymer formulations are curable at relatively low temperatures, as compared to those polymer formulations not comprising contemplated crosslinkers. Transparent films formed from these contemplated formulations are also disclosed. Organic transparent film compositions are also disclosed that comprise: at least one at least one phenol-based polymer, at least one solvent; at least one acid-activated crosslinker; and at least one acid source. Methods of forming organic transparent films with improved transmittance by depositing on a substrate the formulations disclosed herein and curing the formulations or compositions at a temperature of less than about 200° C. Inorganic transparent film compositions are disclosed that include: at least one silanol-based polymer, at least one solvent; at least one acid-activated crosslinker; and at least one acid source. Methods of forming inorganic transparent films are disclosed by depositing on a substrate the formulations disclosed herein and curing the formulations or compositions at a temperature of 200° C. or less.

20 Claims, 36 Drawing Sheets

(51) Int. Cl.

| | | |
|---|---|---|
| *C08L 61/10* | (2006.01) | |
| *B05D 3/00* | (2006.01) | |
| *C08K 5/3445* | (2006.01) | |
| *C09D 183/04* | (2006.01) | |
| *C08G 77/04* | (2006.01) | |
| *C08J 5/18* | (2006.01) | |
| *C08L 61/06* | (2006.01) | |

(56) References Cited

U.S. PATENT DOCUMENTS

| | | | |
|---|---|---|---|
| 3,817,902 A | 6/1974 | Gomyo et al. | |
| 4,107,133 A | 8/1978 | Sawai et al. | |
| 4,302,503 A | 11/1981 | Mattimoe | |
| 4,351,935 A * | 9/1982 | Reesink et al. | 528/242 |
| 4,388,449 A | 6/1983 | Bonnet et al. | |
| 4,590,117 A | 5/1986 | Taniguchi et al. | |
| 4,839,427 A * | 6/1989 | Mormile | 525/162 |
| 5,082,758 A | 1/1992 | Hoffend et al. | |
| 5,198,518 A | 3/1993 | Yamamoto et al. | |
| 5,204,432 A | 4/1993 | Saito et al. | |
| 5,319,049 A | 6/1994 | Yoshioka et al. | |
| 5,415,927 A | 5/1995 | Hirayama et al. | |
| 5,460,911 A | 10/1995 | Yu et al. | |
| 5,858,547 A | 1/1999 | Drage | |
| 6,000,339 A | 12/1999 | Matsuzawa | |
| 6,210,856 B1 | 4/2001 | Lin et al. | |
| 6,268,457 B1 | 7/2001 | Kennedy et al. | |
| 6,316,165 B1 | 11/2001 | Pavelchek et al. | |
| 6,410,209 B1 | 6/2002 | Adams et al. | |
| 6,461,717 B1 | 10/2002 | Rutter, Jr. et al. | |
| 6,573,328 B2 | 6/2003 | Kropp et al. | |
| 6,602,552 B1 | 8/2003 | Daraskevich et al. | |
| 6,749,765 B2 | 6/2004 | Rutter, Jr. et al. | |
| 6,770,327 B2 | 8/2004 | Edelmann et al. | |
| 6,838,182 B2 | 1/2005 | Kropp et al. | |
| 6,846,568 B2 | 1/2005 | Yamaya et al. | |
| 6,852,421 B2 | 2/2005 | Wayton et al. | |
| 6,891,237 B1 | 5/2005 | Bao et al. | |
| 7,015,256 B2 | 3/2006 | Ito et al. | |
| 7,018,717 B2 | 3/2006 | Pavelchek | |
| 7,202,013 B2 * | 4/2007 | Ogihara et al. | 430/272.1 |
| 7,270,931 B2 | 9/2007 | Angelopoulos et al. | |
| 7,303,855 B2 | 12/2007 | Hatakeyama et al. | |
| 7,326,442 B2 | 2/2008 | Babich et al. | |
| 7,358,025 B2 | 4/2008 | Hatakeyama | |
| 7,361,444 B1 | 4/2008 | Angelopoulos et al. | |
| 7,425,347 B2 | 9/2008 | Takei et al. | |
| 2001/0006759 A1 * | 7/2001 | Shipley et al. | 430/280.1 |
| 2002/0061453 A1 | 5/2002 | Sato et al. | |
| 2003/0214042 A1 | 11/2003 | Miyazawa | |
| 2003/0235785 A1 * | 12/2003 | Barclay et al. | 430/271.1 |
| 2004/0110084 A1 | 6/2004 | Inomata et al. | |
| 2004/0161698 A1 * | 8/2004 | Kanagasabapathy et al. | 430/270.1 |
| 2004/0253535 A1 * | 12/2004 | Cameron et al. | 430/270.1 |
| 2004/0265754 A1 * | 12/2004 | Barclay et al. | 430/322 |
| 2005/0074689 A1 | 4/2005 | Angelopoulos et al. | |
| 2005/0171277 A1 | 8/2005 | Li et al. | |
| 2005/0225238 A1 | 10/2005 | Yamazaki | |
| 2006/0035419 A1 | 2/2006 | Lu et al. | |
| 2006/0257575 A1 | 11/2006 | Macor et al. | |
| 2007/0135581 A1 | 6/2007 | Takei et al. | |
| 2007/0197727 A1 | 8/2007 | Lewin et al. | |
| 2008/0003524 A1 | 1/2008 | Kishioka et al. | |

FOREIGN PATENT DOCUMENTS

| | | |
|---|---|---|
| JP | 6158788 A | 3/1986 |
| JP | 2001092122 A | 6/2001 |
| JP | 2004177952 A | 6/2004 |
| KR | 10-2002-0095187 | 12/2002 |
| KR | 10-2006-0056368 A | 5/2006 |
| WO | 9600758 | 1/1996 |
| WO | 03044077 A1 | 5/2003 |
| WO | 03044078 A1 | 5/2003 |

OTHER PUBLICATIONS

Pigment Green 7, 15832-14-5, Chemical Book obtained from Google search the page is http://www.chemicalbook.com/ChemicalProductProperty_EN_CB399460.htm and was downloaded on Feb. 20, 2014, 3 pages.

Xu et al, "Absorption and Exciton Emission by an Aggregated Cyanine Dye Occluded within Mesoporous SBA-15", J. Phys. Chem. B, vol. 106, 2002, pp. 1991-1994, published on line Jan. 29, 2002.

* cited by examiner

Table 1

| Bake Temperature 60 s single bake | Film Thickness (after coating) | | Film Thickness (after PGMEA) | | Film Thickness | |
|---|---|---|---|---|---|---|
| | Average | Std Dev | Average | Std Dev | Film thickness Loss, Å | % Retention |
| 140 | 2794.2 | 11.5 | 2773.7 | 3.8 | 20.4 | 99.3 |
| 160 | 2760.9 | 5.1 | 2747.8 | 2.3 | 13.1 | 99.5 |
| 180 | 2738.0 | 7.5 | 2715.6 | 6.2 | 22.4 | 99.2 |
| 200 | 2729.1 | 5.5 | 2707.6 | 10.1 | 21.5 | 99.2 |

FIG. 4A

Table 2

| Step No. | Time (sec) | Spin (rpm) | Acc | Move (EBR) | Speed (EBR) | Chemical line 1 | Nozzle rinse 1 | Nozzle 1 dispense | Nozzle 1 home | Chemical line 2 | Nozzle rinse 2 | Nozzle 2 dispense | Nozzle 2 home | Edge bead rinse | EBR nozzle dispense | EBR nozzle home | Backside rinse | Cup rinse | Cup rinse fling | Nozzle cup clean | Chip exhaust open |
|---|---|---|---|---|---|---|---|---|---|---|---|---|---|---|---|---|---|---|---|---|---|
| 1 | 0.2 | 0 |   |   |   | 1 | 1 | 1 | 1 |   |   |   |   |   |   |   |   |   |   |   |   |
| 2 | xxx | 1000 |   |   |   |   |   | 1 |   |   |   |   |   |   |   |   |   |   |   |   |   |
| 3 | 6.0 | 1000 |   |   |   |   |   |   | 1 |   |   |   |   |   |   |   |   | 1 | 1 |   |   |
| 4 | 30.0 |   | 1.0 |   |   | 1 | 1 |   |   |   |   |   |   |   |   |   |   | 1 |   |   |   |
| 5 | 1.0 | 1000 |   |   |   |   |   |   |   |   |   |   |   |   |   |   |   | 1 |   |   |   |
| 6 | 6.0 | 1000 | 0.5 |   |   |   |   |   |   |   |   |   |   |   |   |   | 1 | 1 |   |   | 1 |
| 7 | 4.0 | 1500 | 0.5 | 25 | 5 |   |   |   |   |   |   | 1 |   | 1 | 1 |   |   | 1 |   |   | 1 |
| 8 | 4.0 | 1500 | 0.5 | 25 | 5 |   |   |   |   |   |   | 1 |   | 1 | 1 |   |   | 1 |   |   | 1 |
| 9 | 10.0 | 2000 | 0.5 |   |   |   |   |   |   |   |   |   | 1 |   |   | 1 |   | 1 |   |   | 1 |
| 10 |   |   |   |   |   |   |   |   |   |   |   |   |   |   |   |   |   |   |   | 1 | 1 |

Adjust spin speed to target film thickness

Edge bead, Backside & Cup Rinse: PGMEA, OK-73, ethyl lactate

FIG. 4B

Table 3

| Bake T | E (GPa) | E stdev (GPa) | H (GPa) | H stdev (GPa) |
|---|---|---|---|---|
| 150C | 7.776 | 0.229 | 0.498 | 0.023 |
| 150C | 7.977 | 0.176 | 0.561 | 0.019 |
| 250C | 7.626 | 0.157 | 0.533 | 0.014 |
| 250C | 7.596 | 0.133 | 0.523 | 0.013 |

60 s contact bake/air 2.0 μm film thickness

FIG. 12A

Poly(4-vinylphenol) oligomer structure 1440

Novolac oligomer structure 1410

Table 4

| Bakes | Novolac smoke (sec) | | | QUANTITY | Cont. smoke (sec) | | | Quantity |
|---|---|---|---|---|---|---|---|---|
| | HP 1 | HP 2 | HP 3 | | HP 1 | HP 2 | HP 3 | |
| 160/180°C | 0 | 0 | 0 | | | | | |
| 160/180/200°C | 0 | 0 | 0 | | 0 | 0 | 0 | |
| 200°C | | | 26 | Medium | | | | |
| 180/210°C | | 40 | 3 | Light | | | 0 | |
| 160/180/220°C | 0 | 0 | 21 | Light | 0 | 0 | 0 | |
| 180/180/230°C | | 38 | 75 | Light | | | 0 | |
| 180/180/240°C | 0 | 0 | 73 | Medium | 0 | 0 | 0 | |
| 240°C | | | | | | | 1 | Slight on edge |
| 180/180/250°C | | | | | | | 0 | |
| 250°C | | | | | | | 2 | Slight on edge |
| 180/270°C | | | | | | 0 | 0 | |

FIG. 14A

Table 5

| 40851-35 | | 200g | Conc | calc'd solids | 20.868 |
|---|---|---|---|---|---|
| Formulation size | | | | | |
| Target % solids formulation | | 10.33% | | Target conc | Target weight |
| CFU-406-40 | | | 40.40% | 68.74% | 35.167 |
| Powderlink 1170 | | 40851-33A | 100% | 30.71% | 6.347 |
| 5% p-toluenesulfonic acid in PGMEA | | | 5.00% | 0.50% | 2.067 |
| Surfactant (0.05% of solids) in PGMEA | | | 1.00% | 0.05% | 1.033 |
| Sum (Klmer acid surfactant) | | | | | 6.480 |
| PGMEA | | | | | 155.386 |
| Total solids | | | | | 20.574 |
| Total solution | | | | | 200.000 |

Table 7

| Material | % Organol | rpm | bake(1min each) | Over Cure | Thickness (A) | RI | %sig | Thickness (A) | RI | %sig |
|---|---|---|---|---|---|---|---|---|---|---|
| PTG/R-4 | 0.00 | 1200 | 180C/170C | 250/60min | 5038 | 1.5147 | 0.29 | 5466 | 1.5136 | 0.28 |
| 100% Organo @ 20% solids | 100.00 | 1000 | 180C/170C | 250/60min | 7801 | 1.6164 | 0.31 | 7083 | 1.6093 | 0.24 |
| 50:50 Organosiloxane/Org anic @ 20% solids | 50.00 | 1000 | 180C/170C | 250/60min | 6694 | 1.5328 | 0.34 | 6036 | 1.5832 | 0.39 |
| 25%:75% Organosiloxane/Org anic @ 20% solids | 75.00 | 1000 | 165C/170C | 250/60min | 7147 | 1.5864 | 0.23 | 6774 | 1.5878 | 0.25 |
| 75%:25% Organosiloxane/Org anic @ 20% solids | 25.00 | 1000 | 180C/170C | 250/60min | 6399 | 1.5378 | 0.63 | 5674 | 1.5420 | 1.69 |

FIG. 27A

PROCESSABLE INORGANIC AND ORGANIC POLYMER FORMULATIONS, METHODS OF PRODUCTION AND USES THEREOF

This Application is a Patent Cooperation Treaty Application that claims priority to U.S. Provisional Application Ser. No. 61/031,328 filed on Feb. 25, 2008, which is commonly-owned and incorporated herein in its entirety.

FIELD OF THE SUBJECT MATTER

The field of the subject matter is processable inorganic and organic polymer formulations, methods of productions and uses thereof.

BACKGROUND

The drive to provide consumers with electronic, optoelectronic or any other components in a form that can be carried anywhere is driving the miniaturization of an ever wider array of technologies. From the cell phone to the solar cell, there exists a general need in the fabrication of microelectronic and optoelectronic devices for materials that can be deposited at low cost, are transparent, cured within a limited thermal budget and that can provide planarization of topography caused by complex device and interconnect structures.

Topography arises from processes that selectively add or remove materials in fabrication processes necessitating gap-fill and planarization requirements of dielectrics. New and emerging applications such as flexible displays use plastic substrates with severe topography (surface roughness) that also requires planarization or substrate smoothing as well.

Organic materials have limited application because of their high curing temperatures. For example, some novolac-based compositions including T27 ACCUFLO™, which is manufactured by Honeywell International Inc., require heating to temperatures as high as 275° C. in order to produce solvent resistant films. The use of those high temperatures causes competing reactions, such as oxidation, to occur that result in yellowing or darkening of the films, which is unacceptable for display applications.

Inorganic materials based on siloxanes are highly optically transparent; however, these inorganic materials crosslink only partially at temperatures below 300° C. and therefore contain residual silanol that can be detrimental to device characteristics. Outgassing, low electrical breakdown strength and high leakage result from residual silanols in siloxane-based films.

Therefore, it would be ideal to develop a family of low-temperature thermally curable polymer formulations that exhibit excellent planarization and gap fill, good thermal stability, low outgassing and excellent formulation shelf life, while at the same time, in some embodiments, minimizing yellowing or darkening of the resulting films. Methods of formulating these films, along with the specific chemistries, should be universal across organic and inorganic polymers.

SUMMARY OF THE SUBJECT MATTER

Polymer formulations are disclosed and described herein that comprise: at least one polymer comprising at least one hydroxy functional group, at least one acid source, and at least one acid-activated crosslinker that reacts with the polymer. In contemplated embodiments, these polymer formulations are curable at relatively low temperatures, as compared to those polymer formulations not comprising contemplated crosslinkers. Transparent films formed from these contemplated formulations are also disclosed.

Organic transparent film compositions are also disclosed that comprise: at least one at least one phenol-based polymer, at least one solvent; at least one acid-activated crosslinker; and at least one acid source. In some embodiments, an organic transparent film is disclosed that includes at least one novolac polymer; at least one glycoluril crosslinker; and at least one acid source. Methods of forming organic transparent films with improved transmittance by depositing on a substrate the formulations disclosed herein and curing the formulations or compositions at a temperature of 200° C. or less.

Inorganic transparent film compositions are disclosed that include: at least one silanol-based polymer, at least one solvent; at least one acid-activated crosslinker; and at least one acid source. Methods of forming inorganic transparent films are disclosed by depositing on a substrate the formulations disclosed herein and curing the formulations or compositions at a temperature of 200° C. or less.

BRIEF DESCRIPTION OF THE FIGURES AND TABLES

Contemplated spin-coat recipes are shown in FIG. 4B, which shows Table 2.

Figure 5:
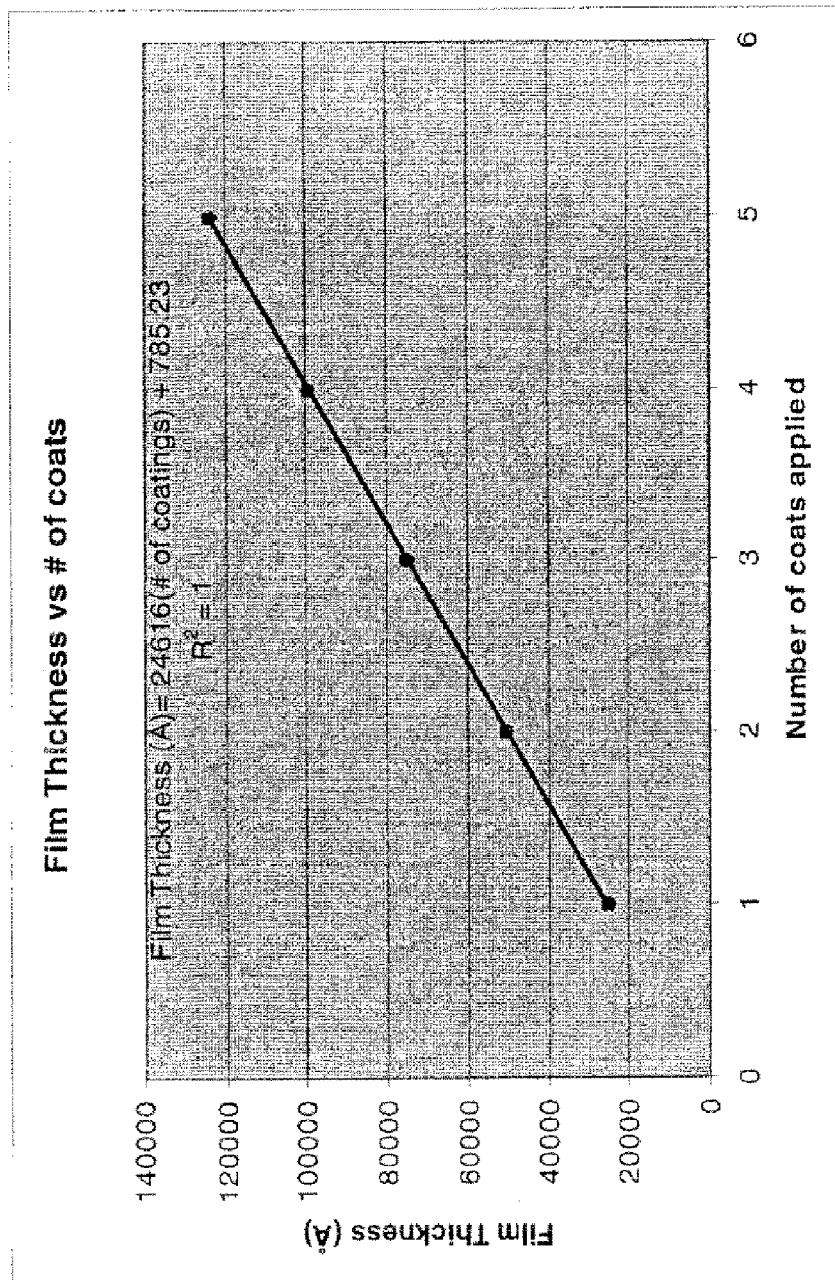

FIG. 5 shows film thickness for a series of sequential coatings in which the bake temperature was 135° C./60 s using three sequential hotplates for each coating for a contemplated organic polymer formulation.

Figure 6:
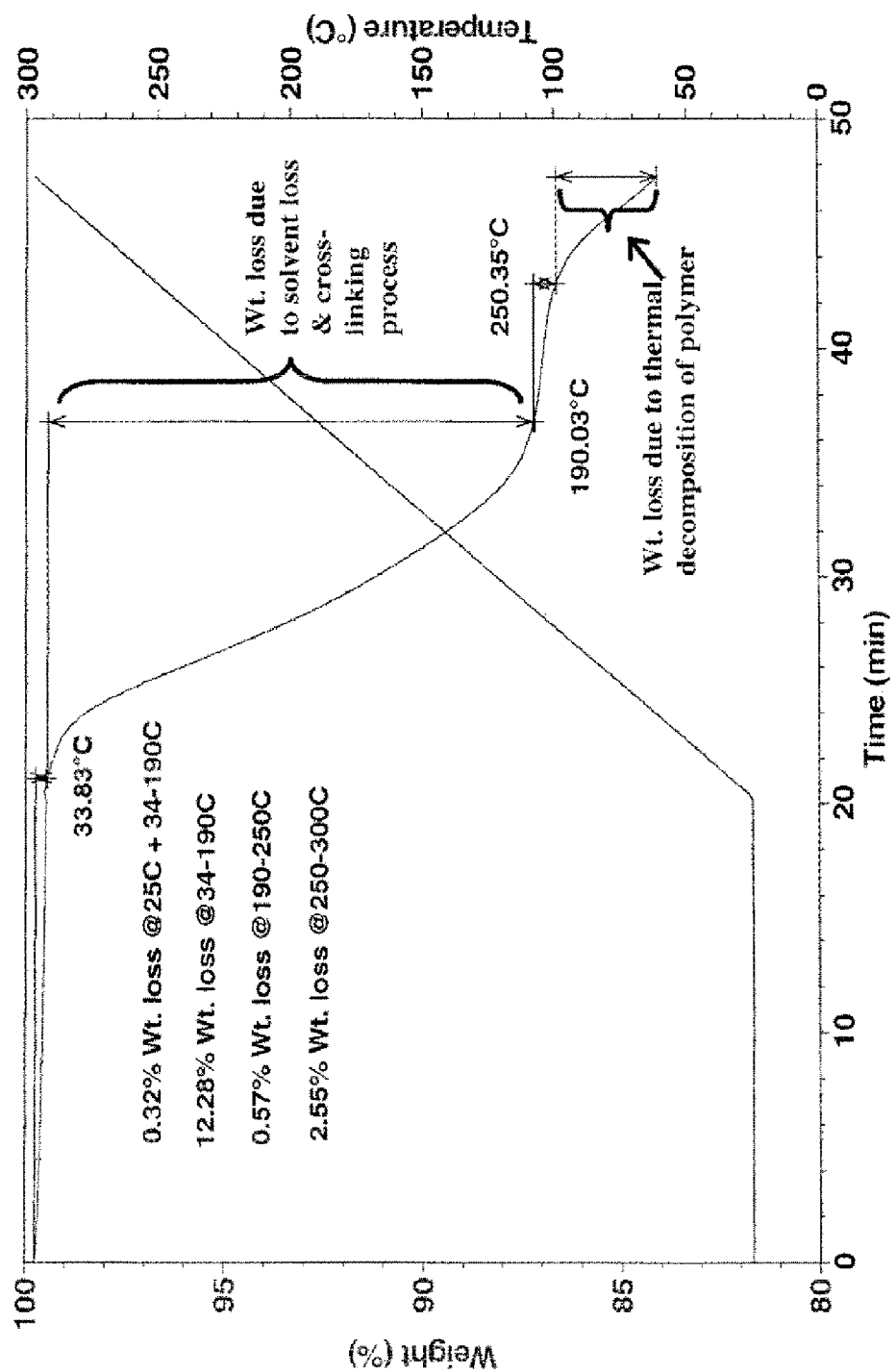

FIG. 6 shows thermal gravimetric analysis data for a contemplated organic polymer formulation using a single thermal ramp up to 300 C at 10 C/min.

Figure 7:
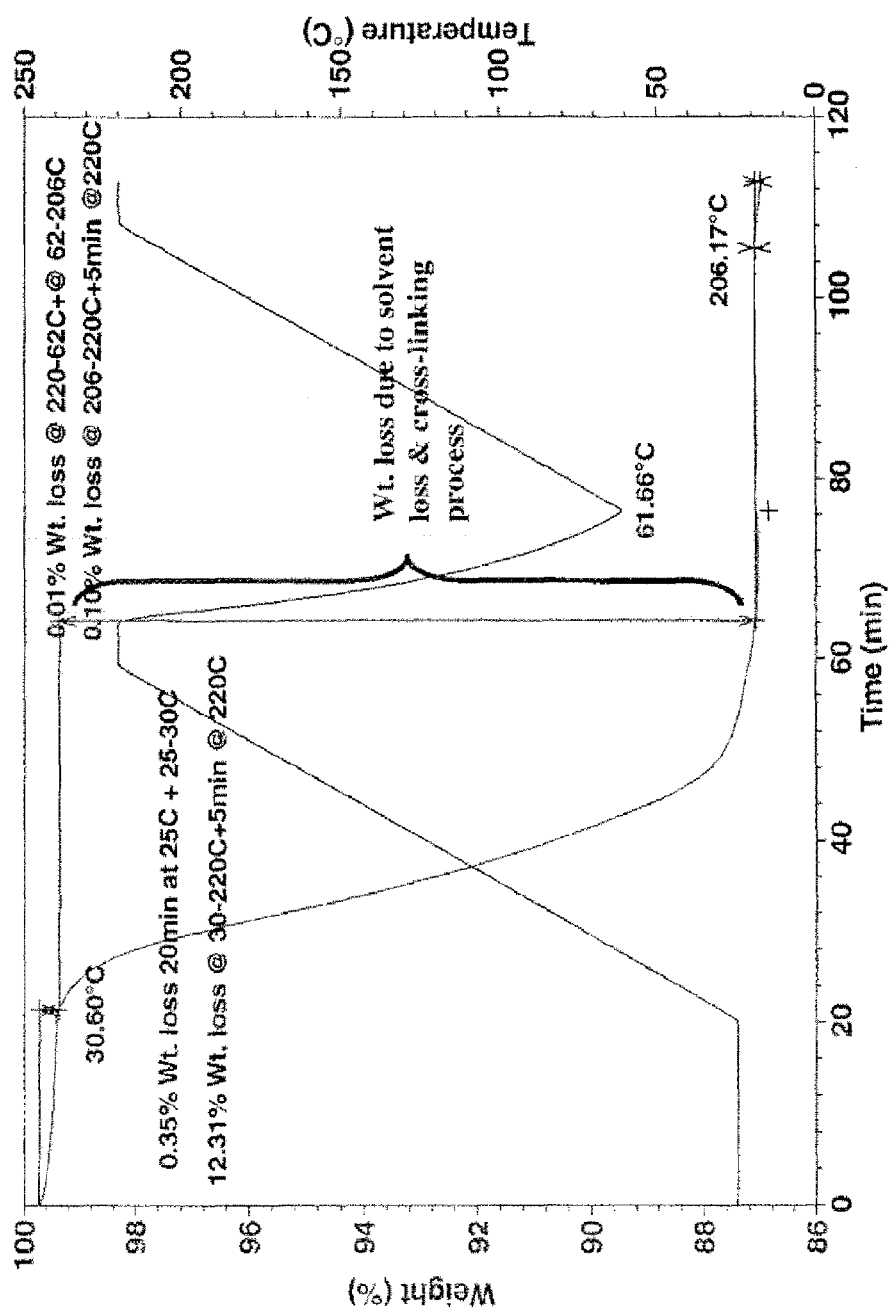

FIG. 7 shows thermal gravimetric analysis data for a contemplated organic polymer formulation subjected to two sequential temperature cycles up to 220 C.

Figure 8:
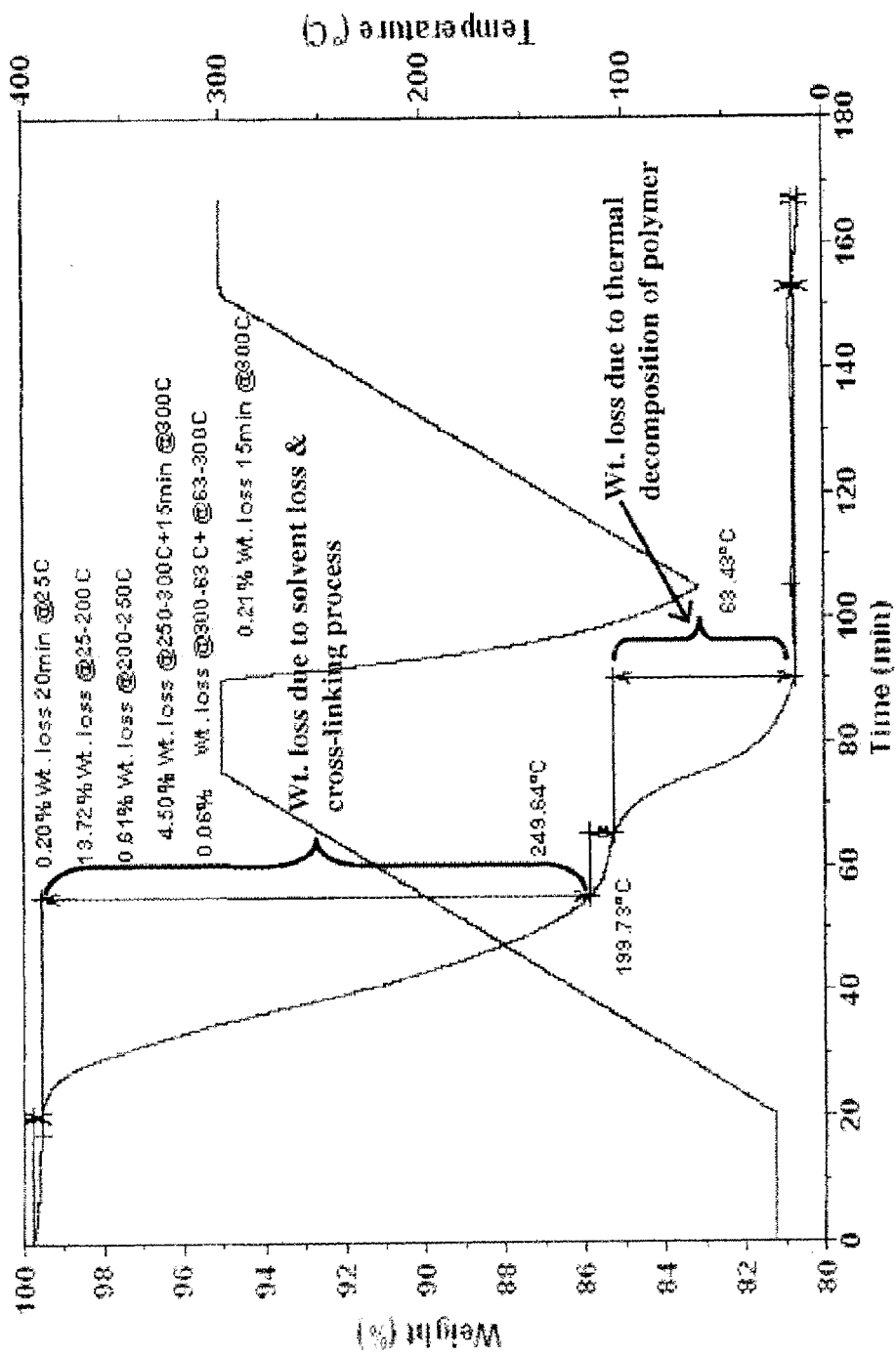

FIG. 8 shows thermal gravimetric analysis data for a contemplated organic polymer formulation subjected to two sequential temperature cycles up to 300 C.

Figure 9:
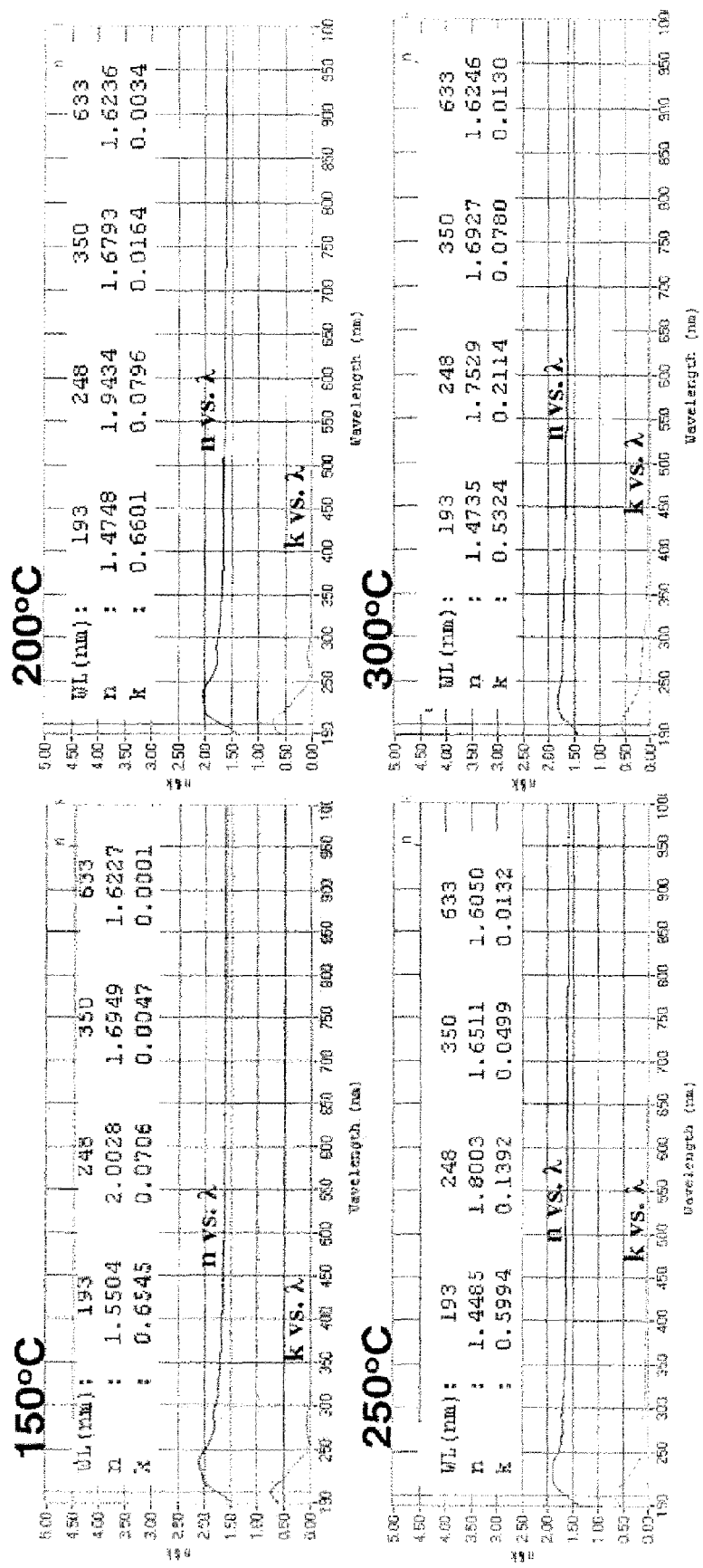

FIG. 9 shows n (refractive index) and k (absorption coefficient) for a contemplated organic polymer formulation subjected to four different bake temperatures.

Figure 10:
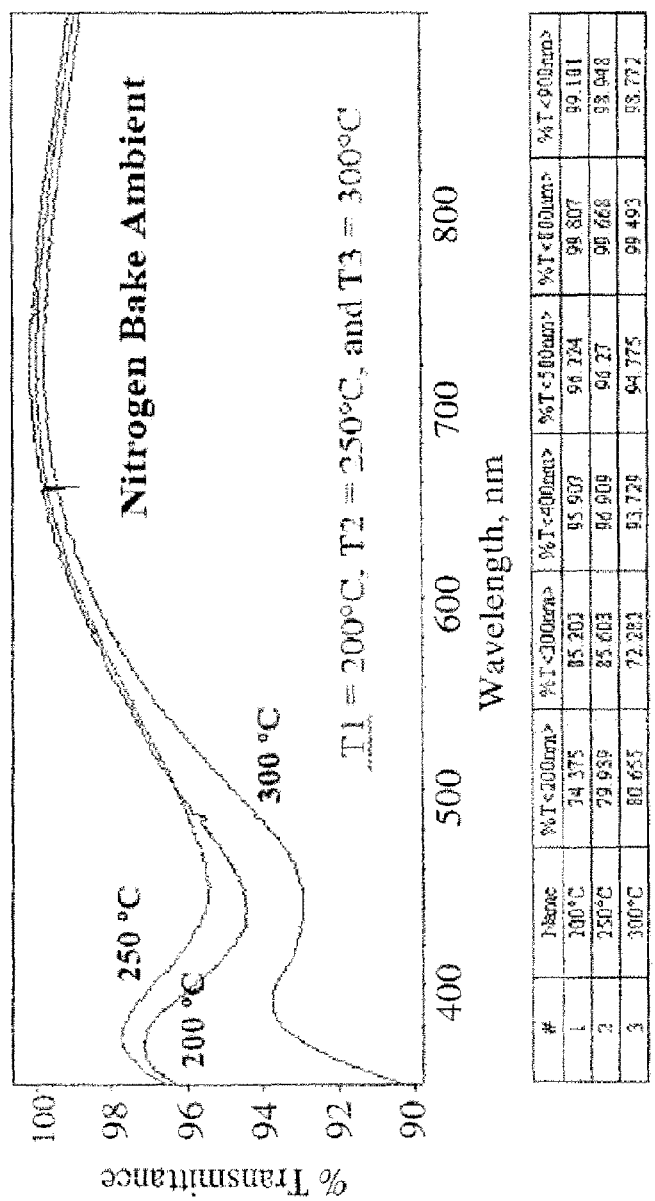

FIG. 10 shows % transmittance vs wavelength for a contemplated organic polymer formulation baked under nitrogen.

Figure 11:
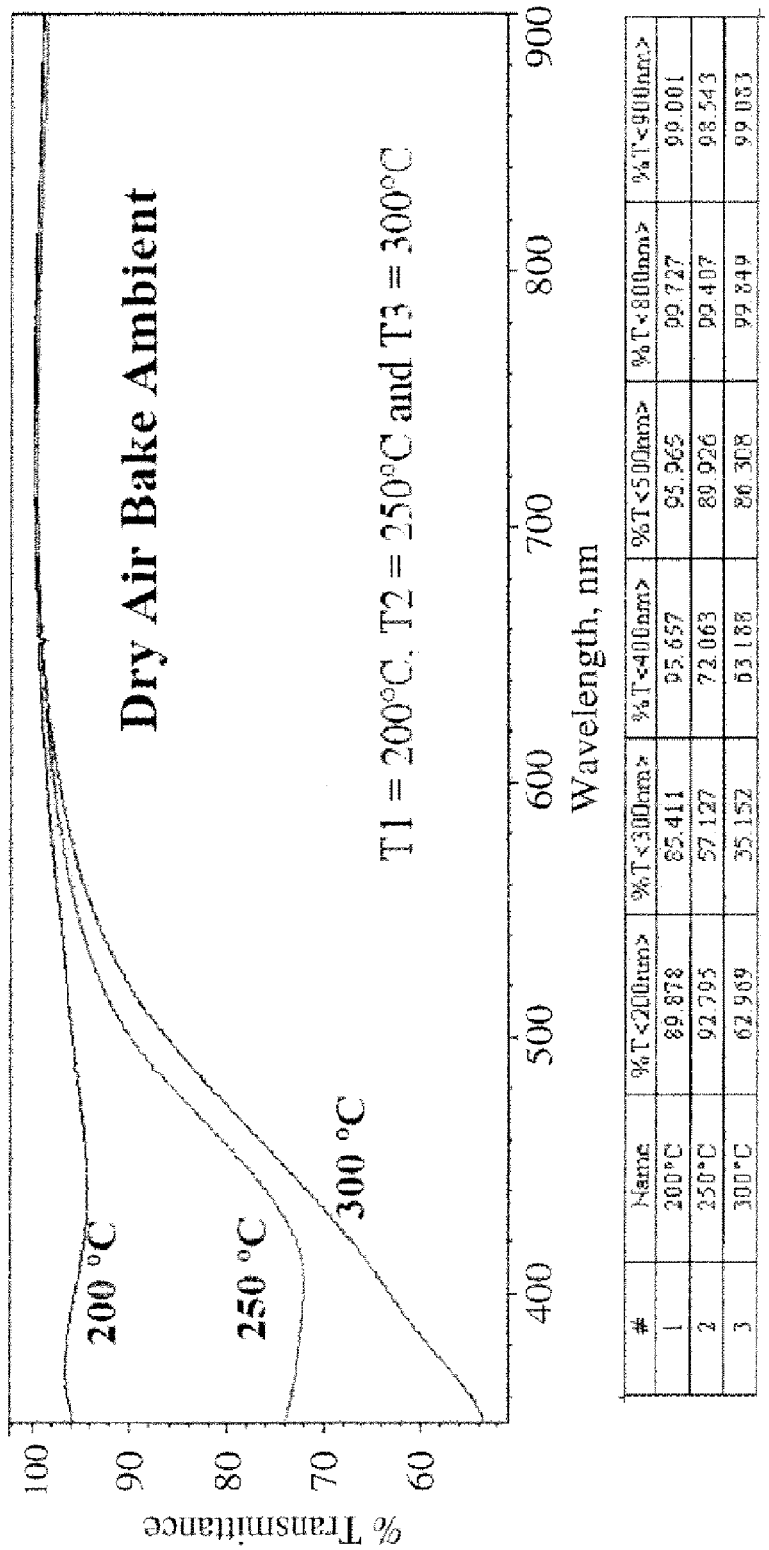

FIG. 11 shows % transmittance vs wavelength for a contemplated organic polymer formulation baked in air.

Figure 12:
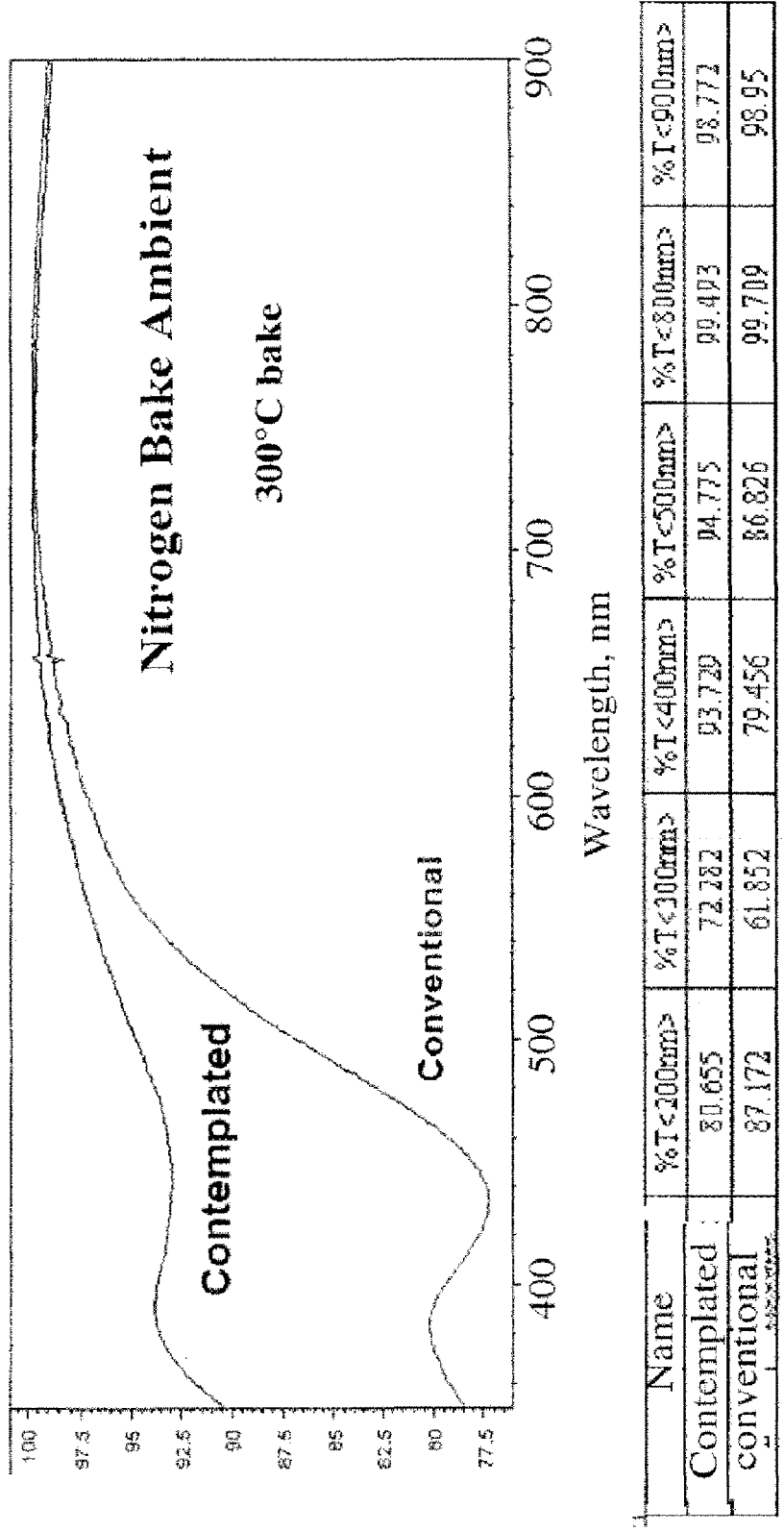

FIG. 12 shows the transparency of a contemplated organic polymer film, versus a conventional novolac-based polymer film (Accuflo-T27) baked under nitrogen at 300 C.

FIG. 12A shows Table 3, which shows modulus and hardness data for a contemplated organic polymer formulation.

Figure 13:
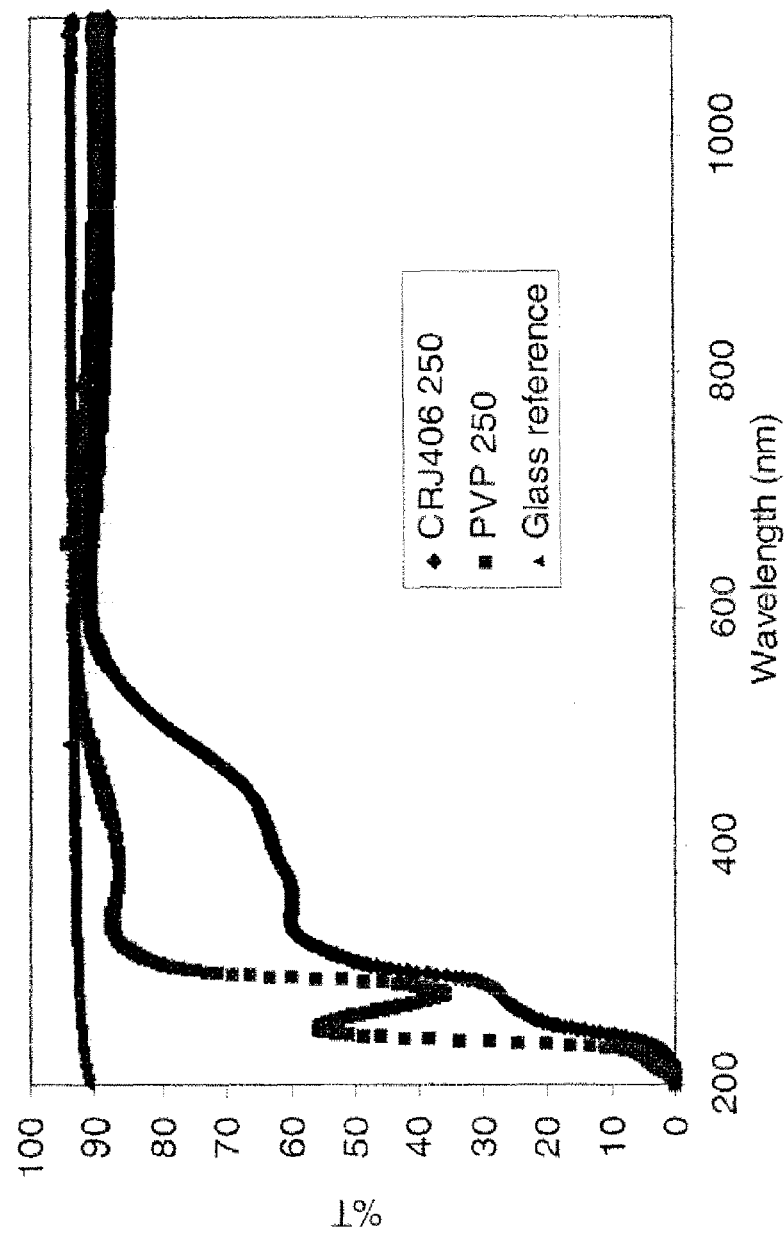
Figure 14:
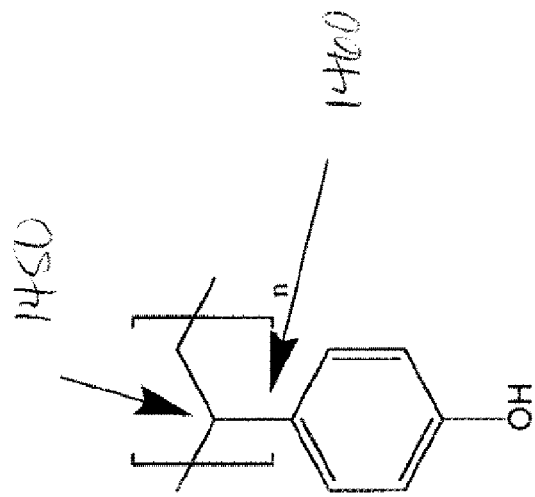
Figure 14:
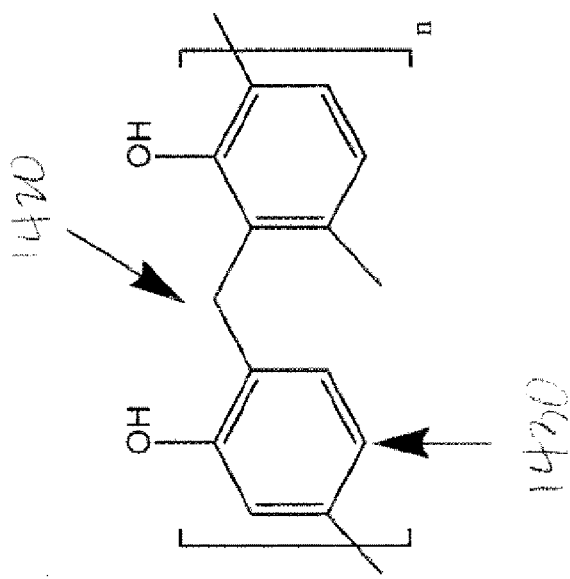

FIG. 13 shows % transmittance for poly(4-vinylphenol) and novolac polymers baked in air at 250 C along with a glass reference FIG. 14 shows the chemical structures explaining why PVP polymers are more oxidation resistant than novolac polymers and hence more optically transparent FIG. 14A shows Table 4, which shows a qualitative assessment of degree of sublimation during bake referred to as the smoke test for contemplated organic formulations as well as novolac.

Figure 15:
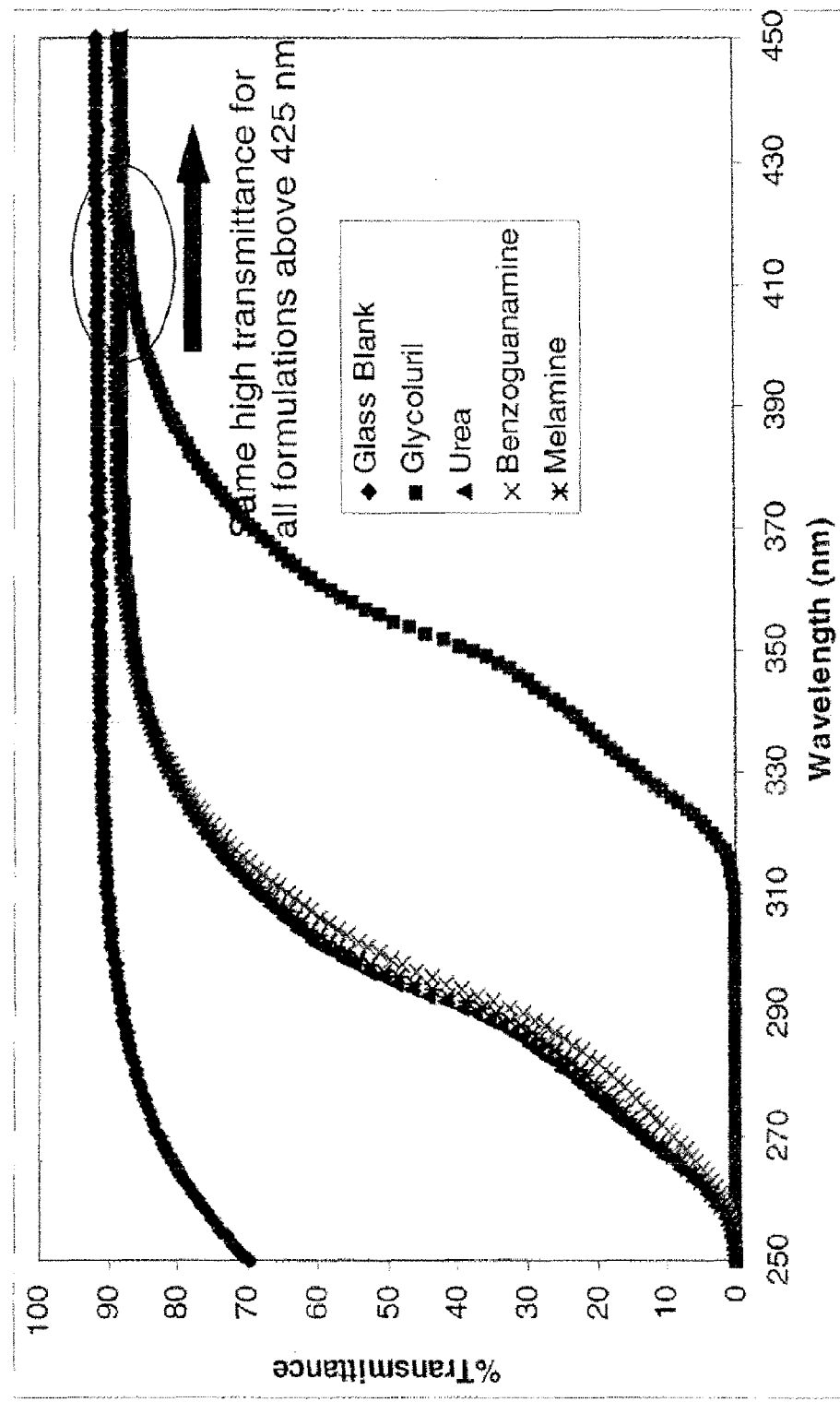

FIG. 15 shows % transmittance data for a series of crosslinkers (melamine/benzoguanamine/urea-formaldehyde crosslinkers) which demonstrate increased optical transmittance in the 250-425 nm range relative to the tetrabutoxyglycoluril crosslinker (D).

Figure 16:
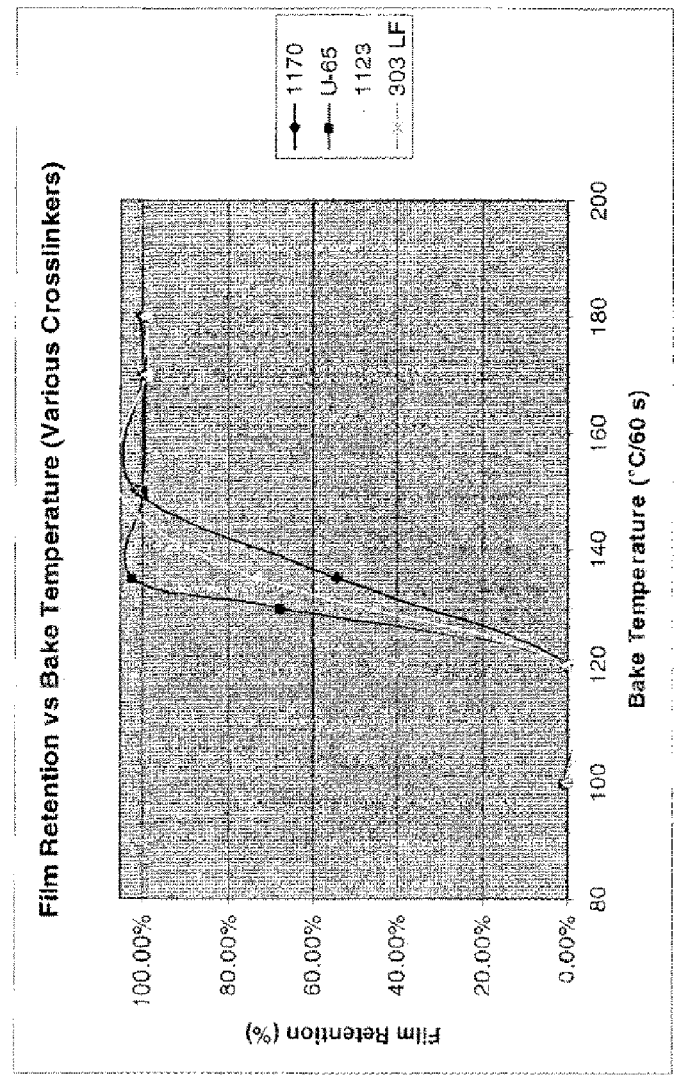

FIG. 16 shows solvent resistance for films derived from contemplated organic formulations containing different crosslinkers as a function of bake temperature.

Figure 17:
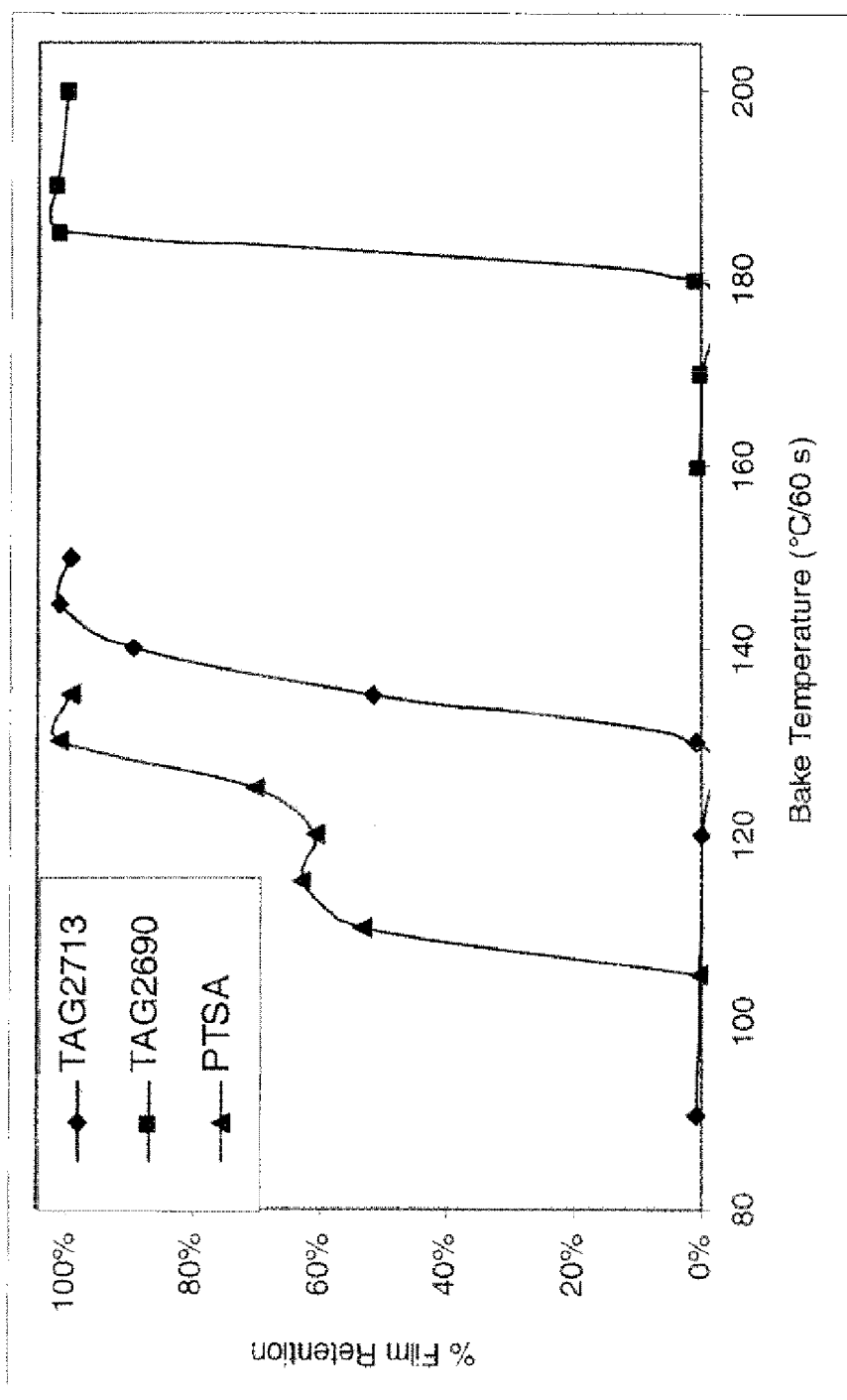

FIG. 17 shows the solvent resistance as a function of bake temperature for three contemplated organic formulations using catalysts that activate at different temperatures.

Figure 18:
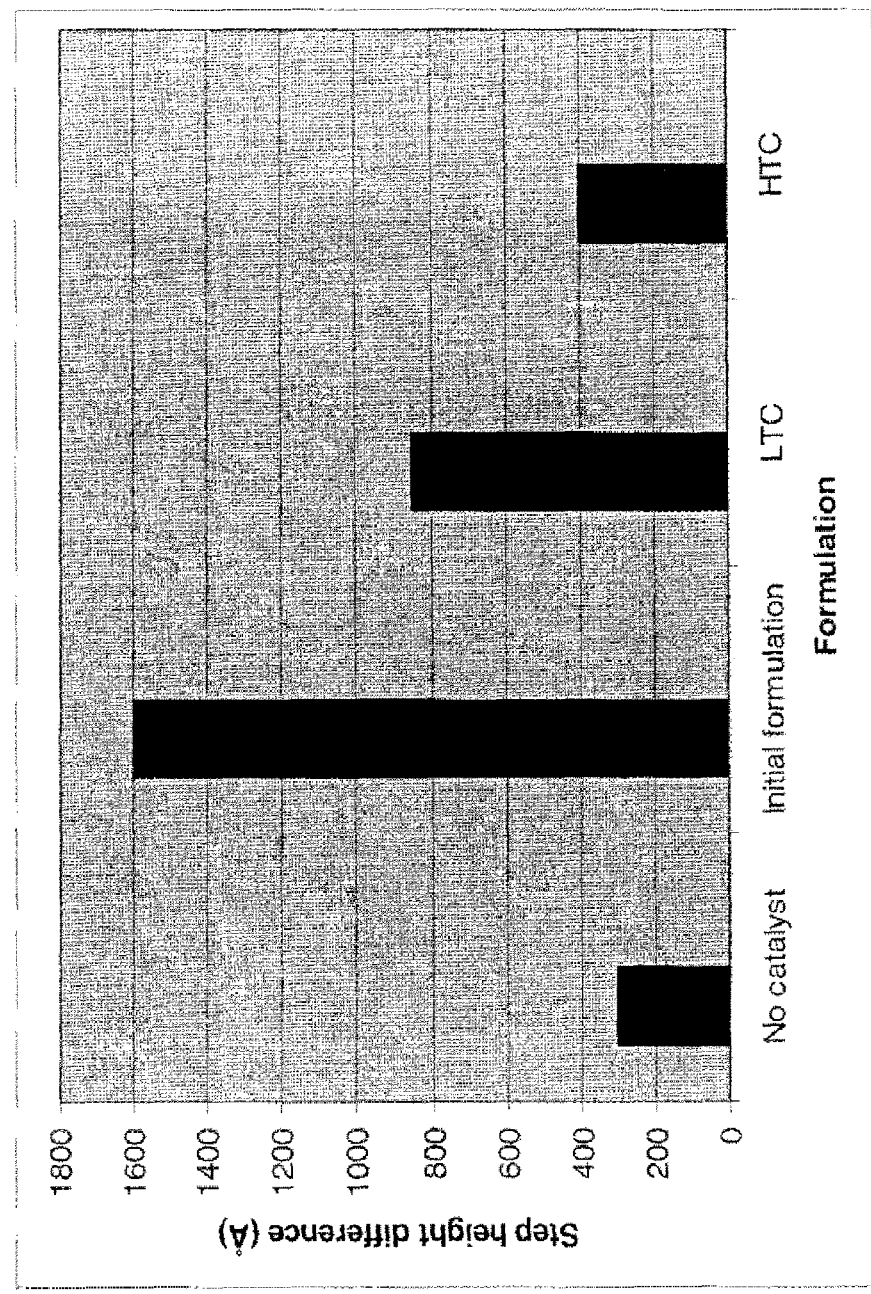

FIG. 18 shows semiglobal planarization using films derived from contemplated organic polymer formulations. This is expressed as the average step height difference from a field area to an array of dense trenches.

Figure 19:
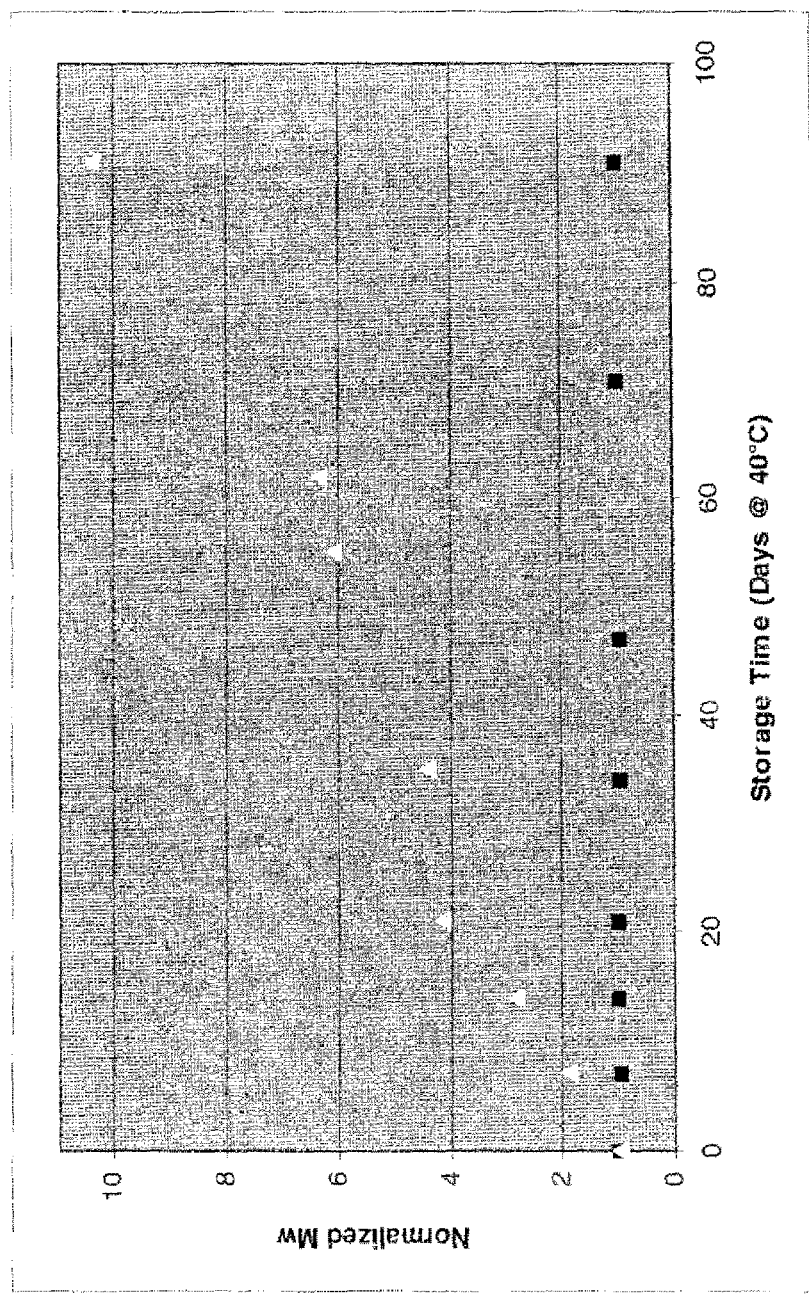
Figure 20:
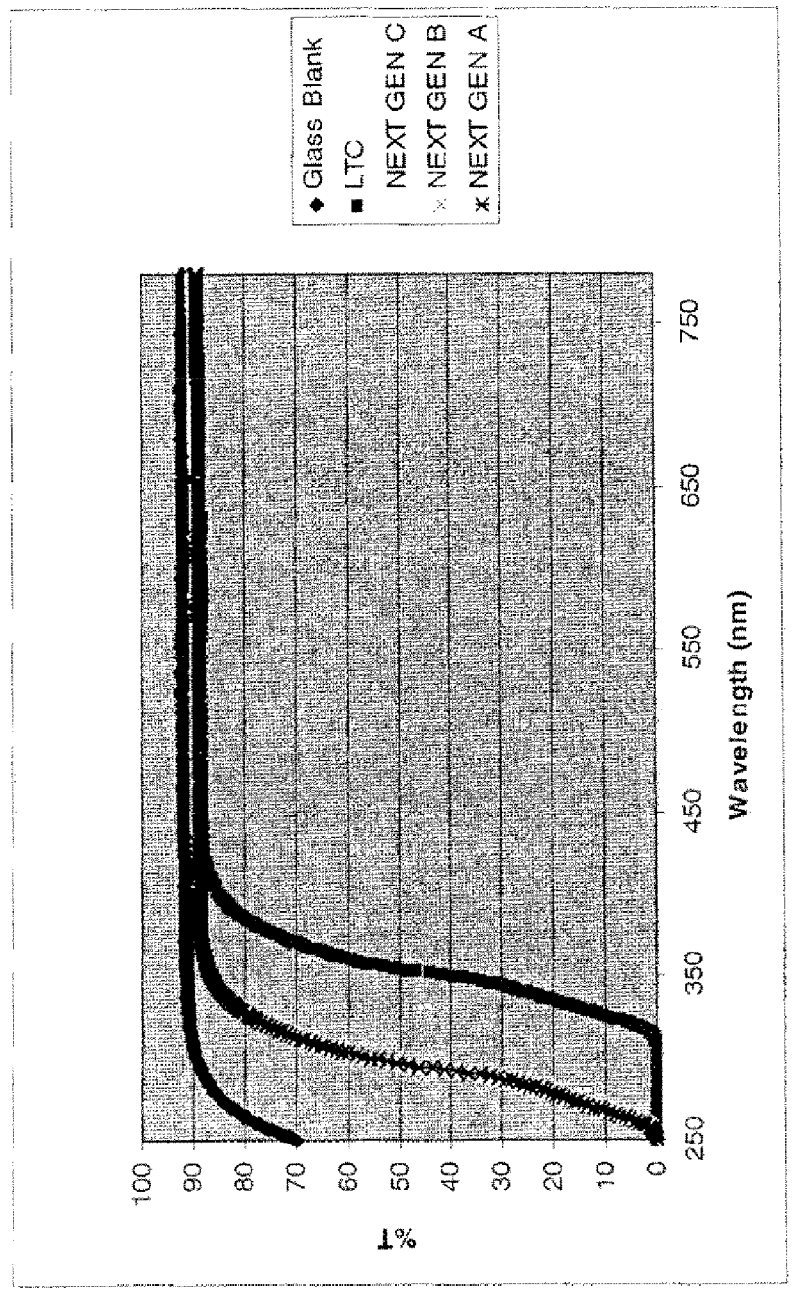

FIG. 19 shows normalized molecular weight of contemplated organic formulations containing different catalysts stored at 40 C FIG. 20 shows % transmittance of films derived from contemplated organic formulations containing different crosslinkers from 250-800 nm as well as a glass reference.

FIG. 20A shows Table 5, which shows a representative formulation spreadsheet for contemplated organic formulations.

Figure 21:
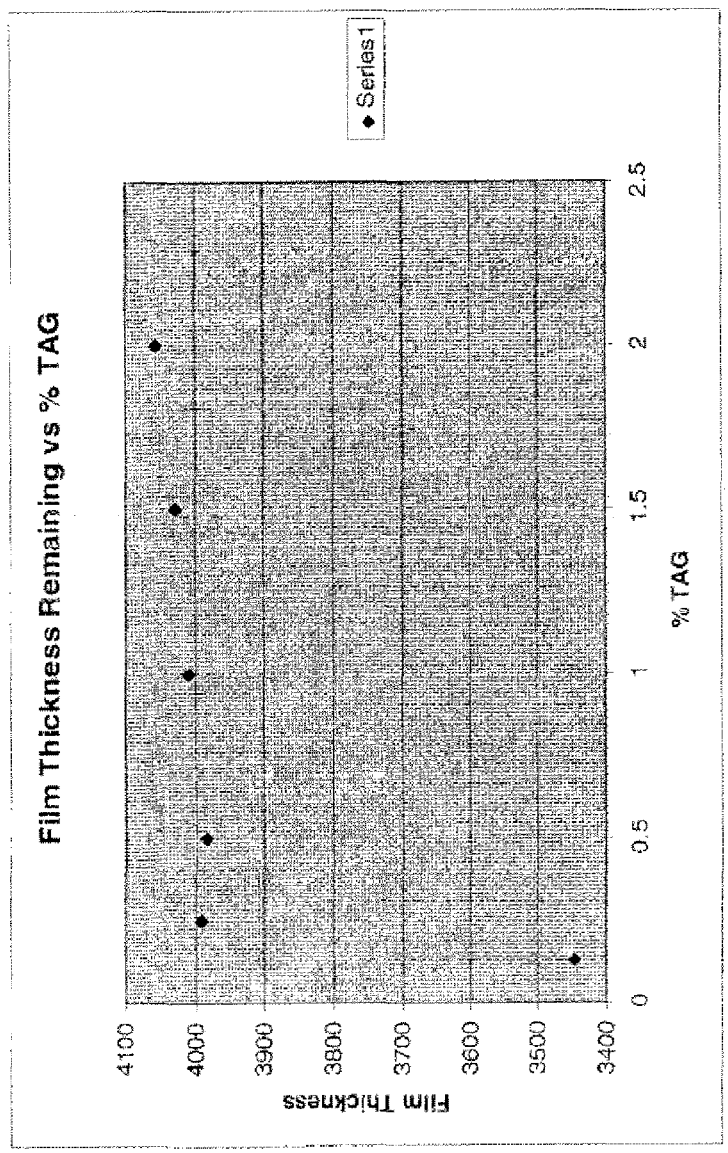

FIG. 21 shows film thickness remaining after PGMEA solvent resistance testing as a function of TAG concentration. Even at 0.125% TAG, the film has >75% film retention.

Figure 22:
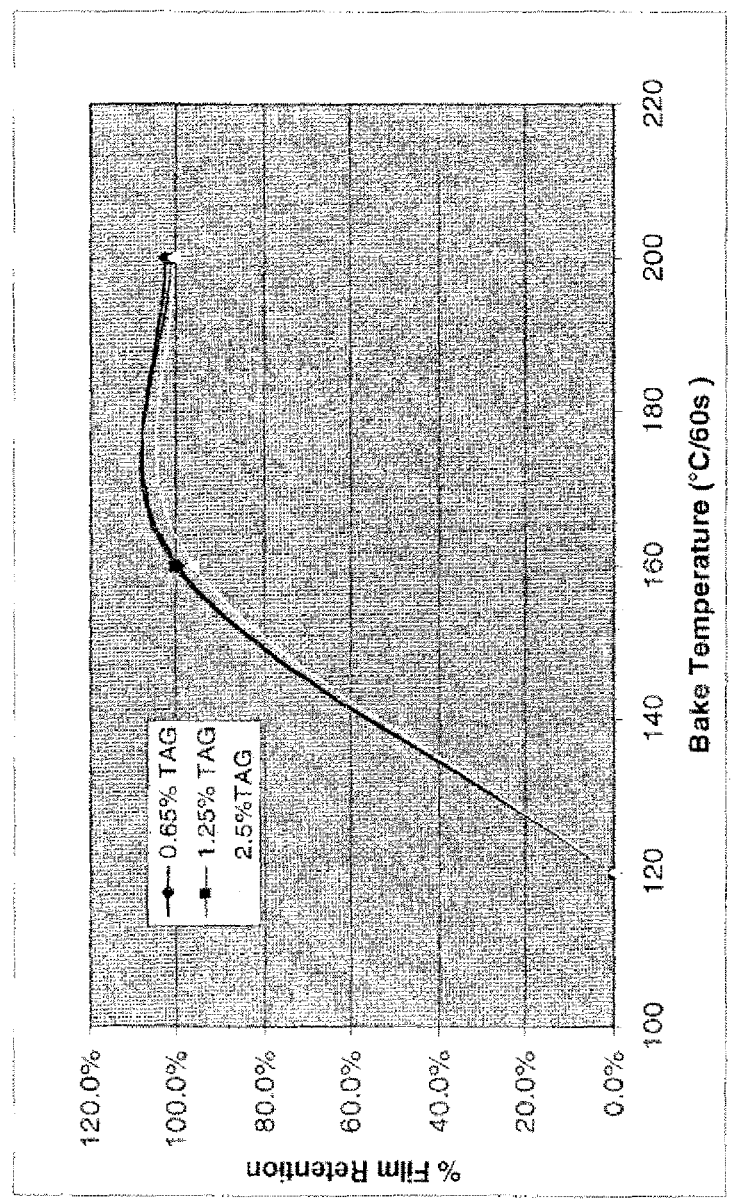

FIG. 22 shows an example designed to determine the onset temperature for crosslinking using high levels of TAG (Nacure 1557) in films derived from a contemplated inorganic polymer formulation.

Figure 23:
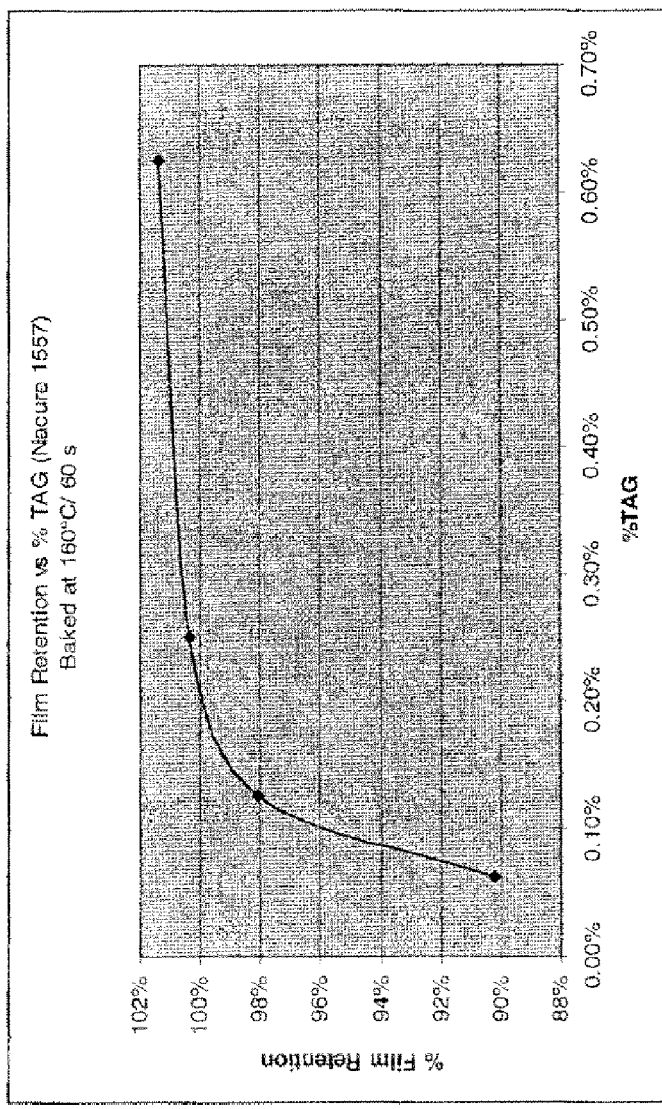
Figure 24:
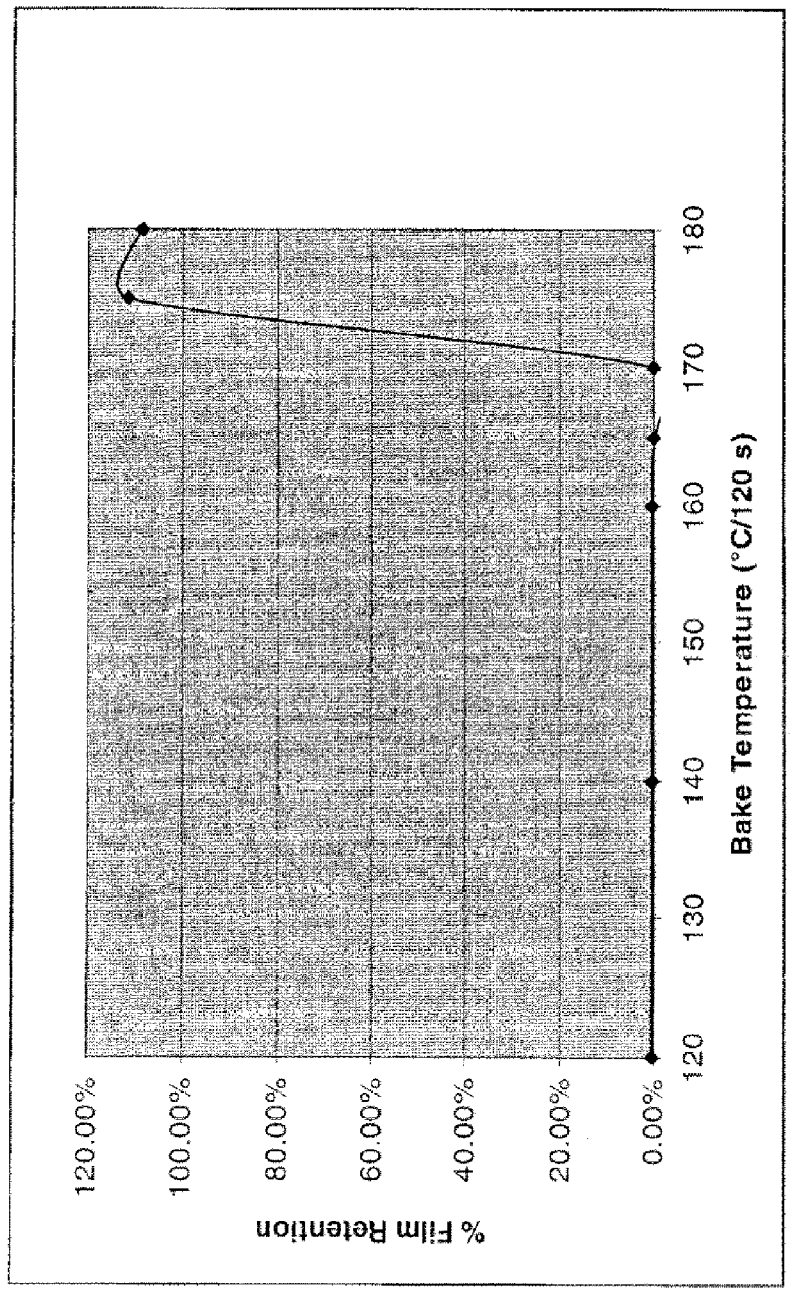

FIG. 23 shows determination of the minimum TAG level required to produce solvent resistance using Nacure 1557 in films derived from a contemplated inorganic polymer formulation FIG. 24 shows solvent resistance vs bake temperature for films derived from a contemplated inorganic polymer containing TAG2690.

Figure 25:
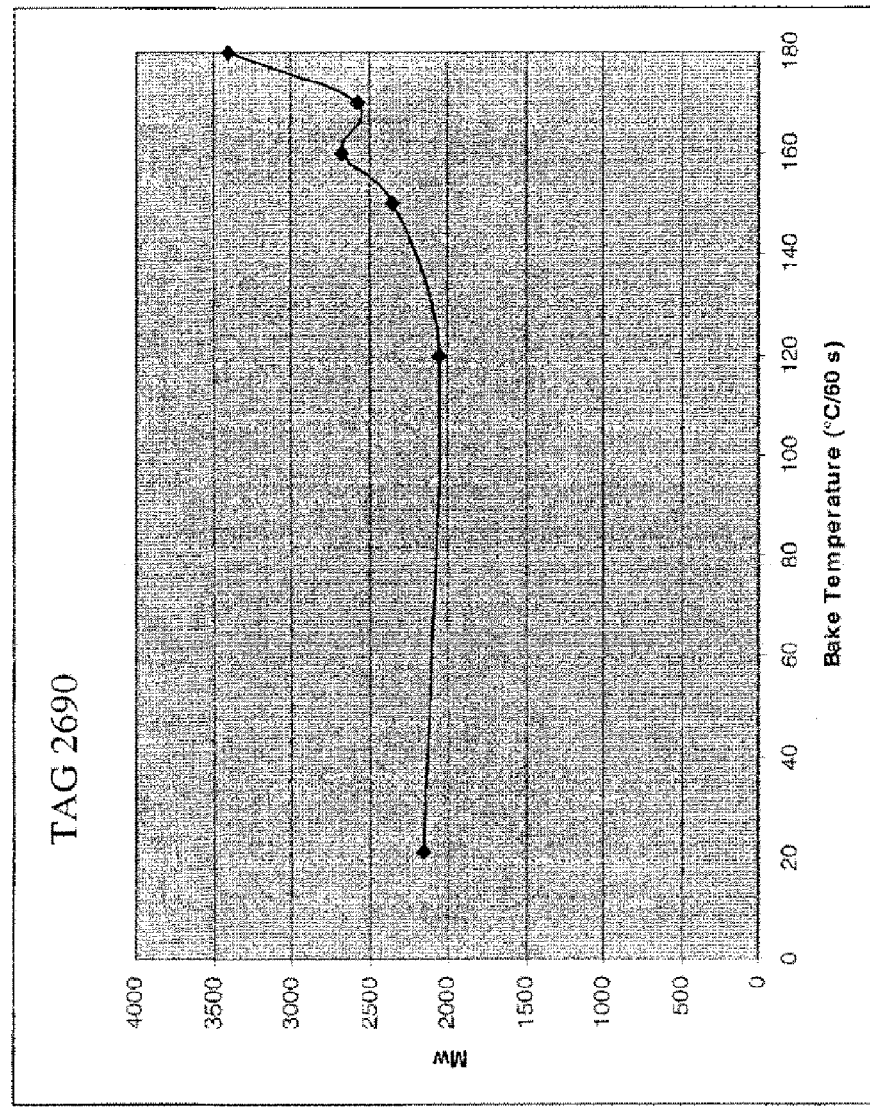

FIG. 25 shows weight average molecular weight vs bake temperature for films derived from a contemplated inorganic polymer formulation containing TAG2690 demonstrating that Mw does not increase significantly with temperature.

Figure 26:
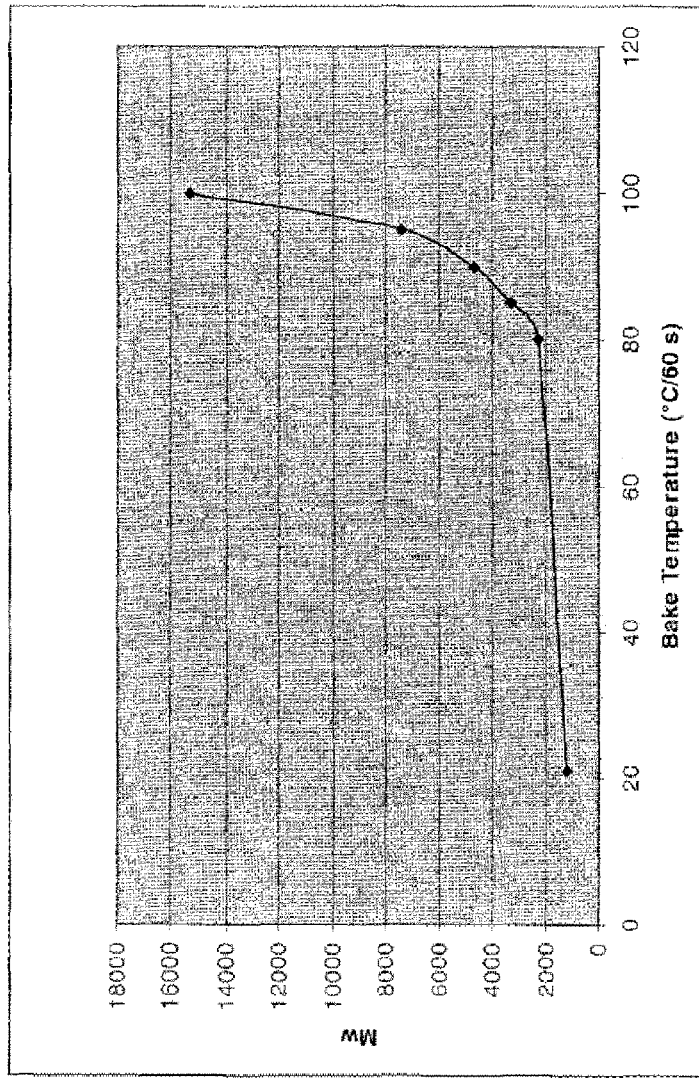

FIG. 26 shows weight average molecular weight vs bake temperature for films derived from a contemplated organic polymer formulation containing p-toulenesulfonic acid demonstrating the rapid increase in Mw prior to gellation. In contrast, the free acid version of ACCULFO T-31 (using an organic material) shows a sharp rise in Mw prior to gellation.

Figure 26A:
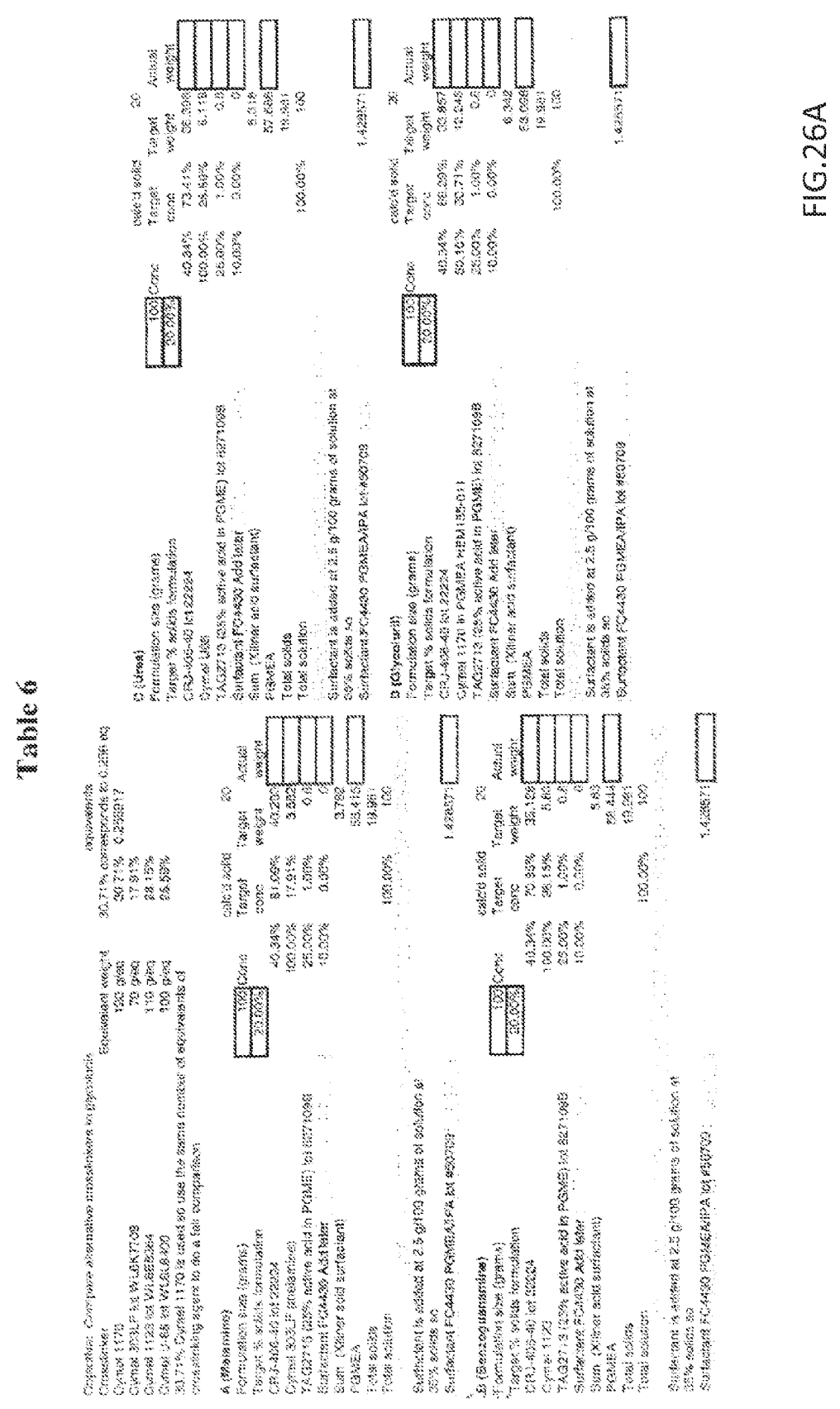

FIG. 26A shows Table 6, which shows representative formulation spreadsheets for contemplated organic formulations containing different crosslinking agents at 20% solids.

Figure 27:
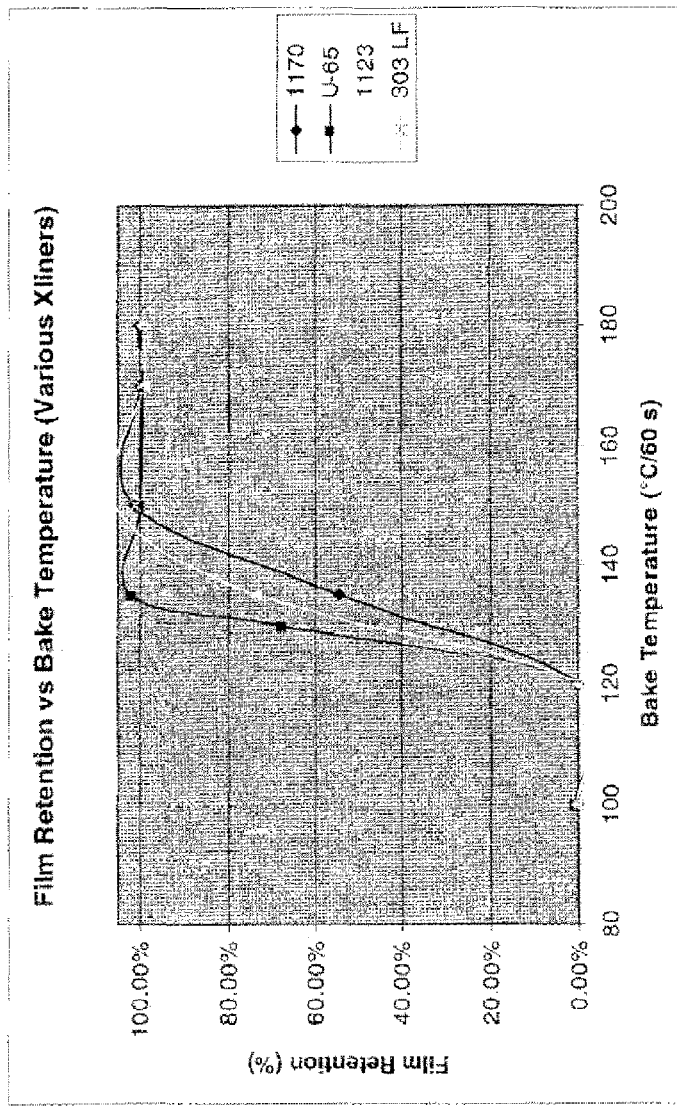
Figure 26:
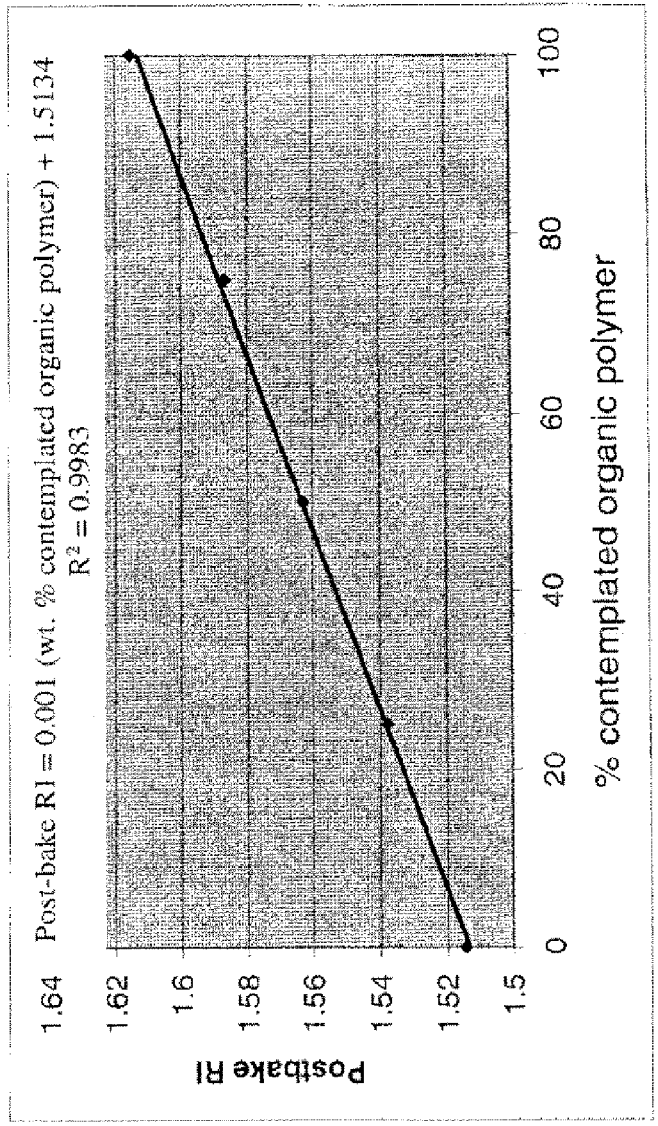
Figure 20:
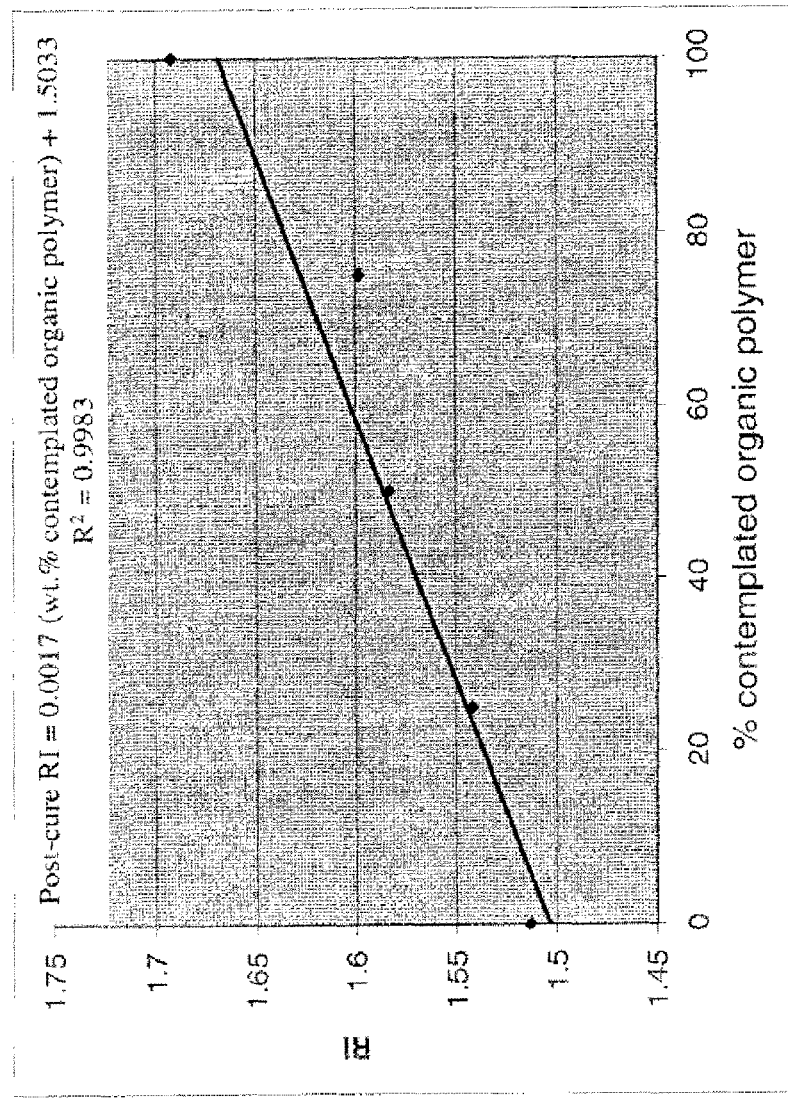

FIG. 27 shows solvent resistance vs bake temperature for the contemplated organic formulations described in Table 6.

FIG. 27A shows Table 7, which describes the materials derived from mixtures of contemplated organic and inorganic polymers.

FIG. 28 shows refractive index of films derived from mixtures of contemplated organic and inorganic polymer formulations after bake. This demonstrates that refractive index can be modulated by changing the relative composition.

FIG. 29 shows refractive index of films derived from mixtures of contemplated organic and inorganic polymer formulations after cure.

DETAILED DESCRIPTION

A family of low-temperature thermally curable polymer formulations have been developed that exhibit excellent planarization and (>94%) gap fill, good thermal stability, low outgassing (<$10^{-7}$ Torr at cure temperature) and excellent formulation shelf life (>3 months at 40° C.). These materials are compatible with photoresist tracks and other polymer deposition systems and are useful in applications such as sacrificial layer etch back planarization, permanent passivation/planarizing dielectric coatings for thin film transistors and flexible substrates, sacrificial dielectrics for microelectromechanical systems (MEMS) and as underfill and wafer bonding materials.

Contemplated formulations and materials have a) low temperature solvent resistance permitting use on thermally sensitive substrates, such as flexible or plastic substrates, b) enhanced transparency relative to the starting polymer (for organic polymers) even when processed at high temperature (in an inert atmosphere), c) excellent formulation stability, d) excellent gap fill/planarization capabilities, e) the ability to be able to produce thick films by multiple coatings without having to use highly viscous solutions, f) utility as an underlayer in trilayer lithographic processes, display applications, modulation of refractive index and etch properties using hybrid systems with organic and inorganic polymers, g) the ability to provide stable and enhanced electrical properties such as stable voltage holding ratio in liquid crystal displays, and h) the ability to form a sacrificial planarizing dielectric in MEMS based devices. Contemplated methods and syntheses are also generally universal when using both organic and inorganic polymers, as will be disclosed herein.

Contemplated performance requirements for these varied applications can be achieved through careful and specific formulation optimization. If components are not chosen properly, de-wetting, volatilization during bake processing and film yellowing, along with formation of particles and poor planarization, can occur in organic films. In extreme cases, some polymer formulations have produced visible smoke during bake, resulting in condensation and particulate build up on equipment over time.

Close collaboration between chemists and device makers has reduced and/or eliminated coating and volatilization issues. The formulations can be tuned to provide application specific properties such as solvent resistance at specific bake temperatures, and varying levels of optical reflectivity, transparency and index matching. This ability to tune certain properties without sacrificing planarization makes these formulations good candidates for both semiconductor and optoelectronic display applications.

Contemplated inorganic materials demonstrate many of the same properties as the organic analogues including low temperature solvent resistant coatings and excellent planarization gap fill properties, but also demonstrate improved electrical properties as a result of this approach purportedly because of the reaction of the crosslinker with the residual silanol functionality. This can be accomplished without requiring organic groups containing phenolic or other organic alcoholic functionality on the organosiloxane polymer.

Contemplated inorganic polymer formulations provide excellent planarization and optical transparency, have a thickness range from 1000 Å to 5 μm) in a single coating, and have a minimum crosslinking temperature of 120° C. The films are hybrid in nature in that the base framework is formed of both organic and inorganic molecules. Contemplated inorganic polymer films are suitable as planarization films for applications in displays, MEMS devices, color filters, and touch panels.

Contemplated organic polymer formulations provide excellent gap fill and planarization, have a wide film thickness range (300 Å to 5 μm) in a single coating or multiple coatings with intermediate bakes for thick films (greater than 12 μm), show good adhesion to adjacent films and have a minimum film cure temperature of about 135° C., which facilitates multi-coat processing to achieve very thick films without thermal degradation and loss of optical clarity in the visible light region of the spectrum for organic polymers. Contemplated polymer films exhibit optical properties (n & k) that are suitable for applications in the areas of displays, light projections and coupling and for multilayer resist patterning. In addition, some contemplated polymer formulations form films that are entirely organic, have thermal stability to temperatures of about 275° C., and have improved transparency across the visible spectrum.

Polymer formulations are disclosed and described herein that comprise: at least one polymer comprising at least one hydroxy functional group, at least one acid source, and at least one acid-activated crosslinker that reacts with the polymer. In contemplated embodiments, these polymer formulations are curable at relatively low temperatures, as compared to those polymer formulations not comprising contemplated crosslinkers. Transparent films formed from these contemplated formulations are also disclosed.

As discussed above, contemplated polymer formulations comprise at least one polymer comprising at least one hydroxy functional group. In some contemplated formulations, the at least one hydroxyl group comprises at least one alcohol substituent or at least one silanol substituent. In some embodiments, the at least one polymer has an inorganic character in that it comprises silicon, such as siloxane resins. In other embodiments, the at least one polymer has an organic character in that it comprises carbon. In these embodiments, the at least one polymer may comprise a phenol-based polymer. In other embodiments, the at least one polymer comprises a novolac or novolac-based polymer or a poly(hydroxyl styrene)-based polymer.

In order to produce the contemplated polymer formulations disclosed herein, at least one crosslinkable polymer is provided that is soluble, miscible and dispersable. These contemplated polymers may comprise R—OH, R—NH or R—SH groups or a combination thereof, where R is carbon, silicon, metal, phosphorus, boron, etc. It is contemplated that metals, as disclosed herein, may include any suitable metal, including aluminum. In some embodiments, these crosslinkable polymers can be utilized with nanoparticles. Useful compositions include physical mixtures of polymers with these materials as well as materials in which a covalent linkage between different materials is present through the crosslinker.

Contemplated crosslinkable polymers should be acidic or nucleophilic enough to react, and the polymer formulations or products of these reactions should not be volatile. Reactions are driven to completion by elimination of volatile byproducts, such as methanol, ethanol or butanol from the crosslinkers. When these polymers are crosslinked in the presence of acid at relatively low temperature, they become insoluble, immiscible and non-dispersible polymer films.

Figure 1:
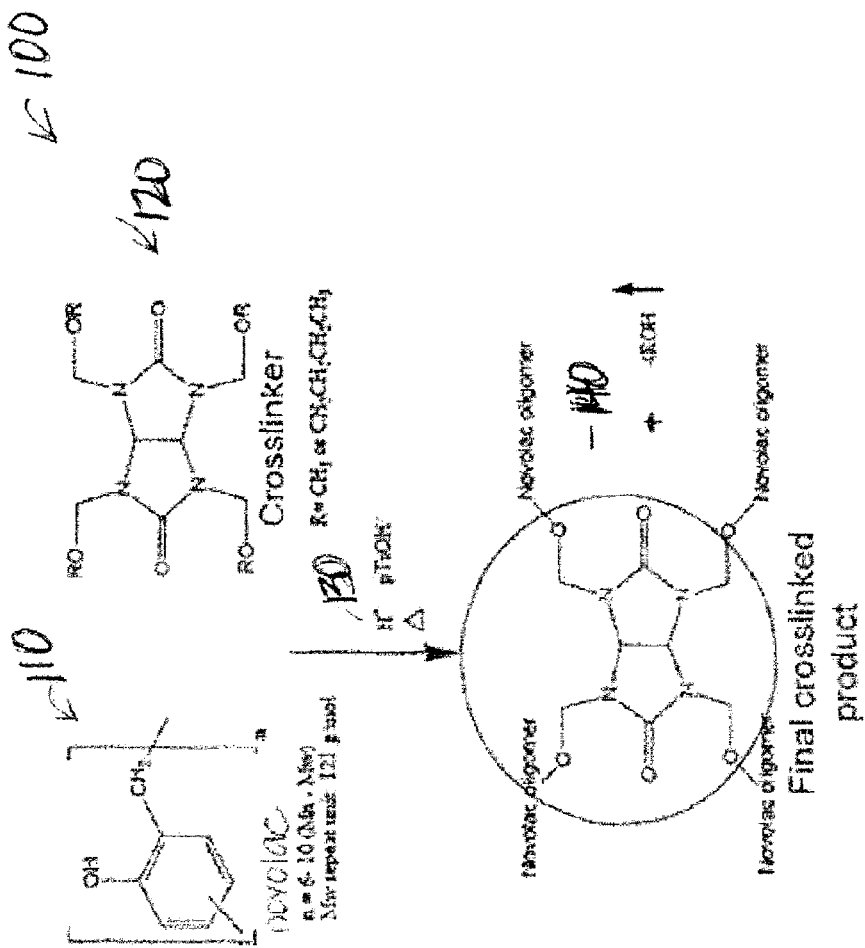
FIG. 1 shows a contemplated reaction pathway.
Figure 2:
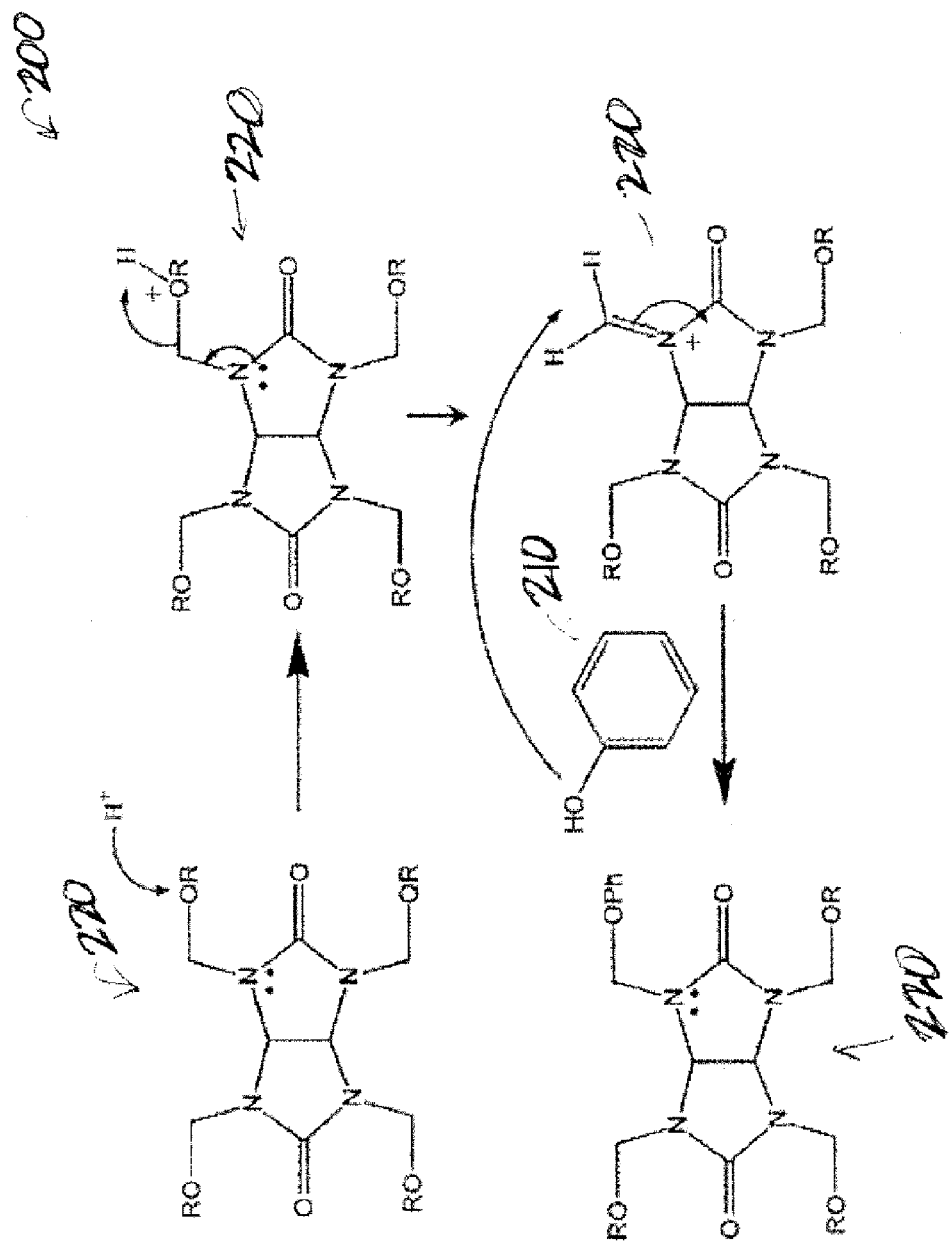
FIG. 2 shows the mechanism of crosslinking for a contemplated embodiment. Two of the applications of contemplated materials are shown in FIG. 3 (spacer concept) and FIG. 4 (glass resist concept) using inorganic polymeric materials.

In a specific reaction pathway, a phenol-based polymer is crosslinked with a crosslinker, such as glycoluril, which is tetrafunctional in the presence of acid. The polymer is crosslinked through this unit. Low molecular weight alcohol R—OH (methanol or butanol) volatilizes and drives the reaction to completion. Because of the difference in equivalent weight, higher quantities of the tetrabutoxy derivative are required compared to the tetramethoxy derivative to achieve the same level of crosslinking. FIG. 1 shows a contemplated reaction pathway 100 where a novolac-based polymer 110 and a contemplated crosslinker 120 is reacted in the presence of an acid 130 to form the final crosslinked product 140. FIG. 2 shows the mechanism 200 of crosslinking for a contemplated embodiment where the crosslinker 220 is reacted with a phenolic entity 210. Contemplated crosslinkers and acid-activated crosslinkers comprise glycoluril, benzoguanamine, melamine or urea with multiple alkylol groups or combinations thereof.

A contemplated organic polymer formulation is prepared by mixing or blending the various components until they are homogenous followed by filtration through an appropriate filter, so that high quality films can be produced. Contemplated organic formulations or compositions comprise the following components: at least one polymer comprising at least one hydroxy functional group, such as a phenol-based polymer or a novolac polymer, wherein the polymer is dissolved in a solvent (PGMEA, for example); at least one acid-activated crosslinker, which may include glycolurils, such as an alkoxyglycoluril, POWDERLINK 1174 (tetramethoxyglycoluril) or CYMEL 1170 (tetrabutoxyglycoluril); and at least one acid source, such as 5% para-toluenesulfonic acid monohydrate in PGMEA.

For those polymer formulations that comprise at least one inorganic polymer, the reaction mechanism is similar to those for the organic polymers, but instead of hydroxy functional groups reacting with contemplated crosslinkers, such as glycolurils, silanol groups react with the contemplated crosslinkers. The pKa of silanol (about 5.5) means that this species is much more acidic than a phenol-based polymer, which has a pKa of about 9.95, so silanol groups should be more reactive.

In contemplated formulations, whether organic or inorganic, contemplated crosslinkers comprise glycolurils, such as an alkoxyglycoluril, POWDERLINK 1174 (tetramethoxyglycoluril) or CYMEL 1170 (tetrabutoxyglycoluril); benzoguanamine, melamine or urea with multiple alkylol groups.

Films produced from silanol-based polymers show resistance to wet chemical strippers that are commonly used to strip photoresists after patterning. In some embodiments, additional beneficial characteristics are captured, including improved electrical properties or qualities. The base resins vary from pure phenysilsesquioxane to co-polymers of methyl/phenyl silsesquioxane (SSQ) to pure methyl SSQ. The scope of other useful silsesquioxanes, organosiloxanes, organosilicates or organosilicones is not limited to these resins. Contemplated resins crosslink effectively at 160-200° C. and are generally thermally cured to convert all of the silanols. Formulations that contain free acids show reasonable stability when stored cold at 4 C, but grow molecular weight at room temperature. However, the formulations show outstanding stability using thermal acid generators (TAGs) as the acid source. It is anticipated that the use of photoacid generators would produce similar stabilization of the formulations.

It should be understood that other acids and acid sources, thermal acid generators and/or photoacid generators can also be used as the acid source. Suitable thermal acid generators include product offerings from King Industries, among others. Suitable photoacid generators are those that respond to the specific type of radiation used (365 (i-line), 248 (DUV, KrF), 193 (DUV, ArF), 157 (DUV, F2), 13.5 (EUV) nm) to generate acid and are soluble in the formulation. Broadband irradiation (350-450 nm) can be used in applications that are less demanding but are sensitive at i-, g, or h-lines (365 nm, 405 nm, 436 nm) of the Hg spectrum.

At least one surfactant, such as BYK307 (from BYK Chemie) or FC4430 (from 3M Corporation), may also be used in contemplated polymer formulations. Surfactants are added to improve wetting or film quality. The choice of surfactant can be dictated by the nature of the polymer. For example, BYK307 contains silicon so it would be best paired with inorganic silicon-based polymers, while FC4430 is organic and would be best paired with organic polymeric formulations or systems. If a silicon-based surfactant is used with an organic system, it may produce problems during dry etch processes where it may mask the etch of underlying organic polymers by formation of $SiO_2$.

At least one solvent or solvent mixture may be used to reach the desired thickness. Contemplated solvents may also comprise any suitable pure or mixture of polar and non-polar compounds. As used herein, the term "pure" means that component that has a constant composition. For example, pure water is composed solely of $H_2O$. As used herein, the term "mixture" means that component that is not pure, including salt water. As used herein, the term "polar" means that characteristic of a molecule or compound that creates an unequal charge, partial charge or spontaneous charge distribution at one point of or along the molecule or compound. As used herein, the term "non-polar" means that characteristic of a molecule or compound that creates an equal charge, partial charge or spontaneous charge distribution at one point of or along the molecule or compound.

In some contemplated embodiments, the solvent or solvent mixture (comprising at least two solvents) comprises those solvents that are considered part of the hydrocarbon family of solvents. Hydrocarbon solvents are those solvents that comprise carbon and hydrogen. It should be understood that a majority of hydrocarbon solvents are non-polar; however, there are a few hydrocarbon solvents that could be considered polar. Hydrocarbon solvents are generally broken down into three classes: aliphatic, cyclic and aromatic. Aliphatic hydrocarbon solvents may comprise both straight-chain compounds and compounds that are branched and possibly crosslinked, however, aliphatic hydrocarbon solvents are not considered cyclic. Cyclic hydrocarbon solvents are those solvents that comprise at least three carbon atoms oriented in a ring structure with properties similar to aliphatic hydrocarbon solvents. Aromatic hydrocarbon solvents are those solvents that comprise generally three or more unsaturated bonds with a single ring or multiple rings attached by a common bond and/or multiple rings fused together. Contemplated hydrocarbon solvents include toluene, xylene, p-xylene, m-xylene, mesitylene, solvent naphtha H, solvent naphtha A, alkanes, such as pentane, hexane, isohexane, heptane, nonane, octane, dodecane, 2-methylbutane, hexadecane, tridecane, pentadecane, cyclopentane, 2,2,4-trimethylpentane, petroleum ethers, halogenated hydrocarbons, such as chlorinated hydrocarbons, nitrated hydrocarbons, benzene, 1,2-dimethylbenzene, 1,2,4-trimethylbenzene, mineral spirits, kerosine, isobutylbenzene, methylnaphthalene, ethyltoluene, ligroine. Particularly contemplated solvents include, but are not limited to, pentane, hexane, heptane, cyclohexane, benzene, toluene, xylene and mixtures or combinations thereof.

In other contemplated embodiments, the solvent or solvent mixture may comprise those solvents that are not considered part of the hydrocarbon solvent family of compounds, such as ketones, such as acetone, diethyl ketone, methyl ethyl ketone and the like, alcohols, esters, ethers and amines. In yet other contemplated embodiments, the solvent or solvent mixture may comprise a combination of any of the solvents mentioned herein.

Each of these choices in the polymer—whether organic or inorganic—provides different advantages depending on the application. For example, contemplated siloxane resins, which in some cases comprises the inorganic series of resins owned and manufactured by Honeywell International Inc., that are designed to planarize the topography associated with stainless steel substrates and the associated high temperature (>400° C.) processes can be crosslinked at low temperatures in the range 120-200° C. Contemplated organic formulations are designed to gap-fill and surface-planarize plastic substrates with low temperature processing in the range 120-200° C. Gap-fill, planarization, smoothing, or leveling is critical for numerous processes including lithographic patterning among others.

Solution-based materials are attractive for flexible displays because of their compatibility with roll to roll processing and the ability to permit the substrate to bend without the film cracking, which would happen with a PECVD inorganic film. Closer matching of the CTE of substrate films with solution deposited films also favors implementation of these formulations and films. Solution-based materials allow for using different coating methods such as dip coating, spray coating, spin or slot die coating, inkjet printing, screen printing, gravure or any other methods.

Some of the contemplated formulations, as described earlier, are completely organic-based polymer systems and as a result will demonstrate high etch selectivity to inorganic materials. Since these contemplated films are completely organic, they can be readily etched using oxygen based plasmas (dry etch) or wet etched using sulfuric peroxide mixtures. Because of their organic nature, these particular materials can oxidize in the presence of oxygen at high temperature, but if the temperature is kept low (<200° C.) they retain their high transparency even when processed in air. This can also be used as an advantage to increase the etch rate of organosiloxane films by incorporation of organic character into the films by using mixtures of organosiloxane and organic polymers together in these formulations.

Incorporation of a formulation package containing at least one acid-activated crosslinker that reacts with a polymer in the presence of an acid source, such as a free acid, a thermal acid generator, a photoacid generator or combination thereof, produces a solvent-resistant film when the film is heated to moderately high temperatures (140-200° C.) permitting subsequent processing. It should be understood that the phrase "solvent resistant" as used herein means resistant to processing solvents, such as PGMEA—which was selected since it is used in many photoresist formulations.

In contemplated embodiments where the polymer formulations are organic in character, low temperature processing prevents undesirable oxidation reactions associated with crosslinking of the unmodified polymer resulting in a more optically transparent film. Contemplated organic materials also meet the other application requirements including high thermal stability, excellent planarization and gap-fill properties and maintenance of the mechanical properties of the polymeric formulation. When low temperature processing is utilized for inorganic polymer formulations electrical behavior of dielectric films can be enhanced as well.

In some embodiments, an organic transparent film may be formed comprising at least one novolac polymer; at least one glycoluril crosslinker; and at least one acid source. These films may be cured at a temperature of less than about 200° C., may be patternable, and may have a film transmittance of at least 80% at visible wavelengths or a combination thereof.

In other embodiments, an inorganic transparent film may be formed comprising at least one silanol-based polymer, siloxane polymer or combination thereof; at least one acid-activated crosslinker, such as a glycoluril crosslinker; and at least one acid source. These films may be cured at a temperature of less than about 200° C., may be patternable, and may have a film transmittance of at least 80% at visible wavelengths or a combination thereof.

In some embodiments, contemplated films may be cured—by what ever method—at a temperature of less than about 180° C. In other embodiments, contemplated films may be cured—by what ever method—at a temperature of less than about 160° C. In yet other embodiments, contemplated films may be cured—by what ever method—at a temperature of less than about 140° C.

In some embodiments, contemplated films have a film transmittance of greater than about 80%. In other embodiments, contemplated films have a film transmittance of greater than about 85%. In yet other embodiments, contemplated films have a film transmittance of greater than about 90%. In even other embodiments, contemplated films have a film transmittance of greater than about 95%. And in yet other embodiments, contemplated films have a film transmittance of greater than about 99%.

Figure 3:
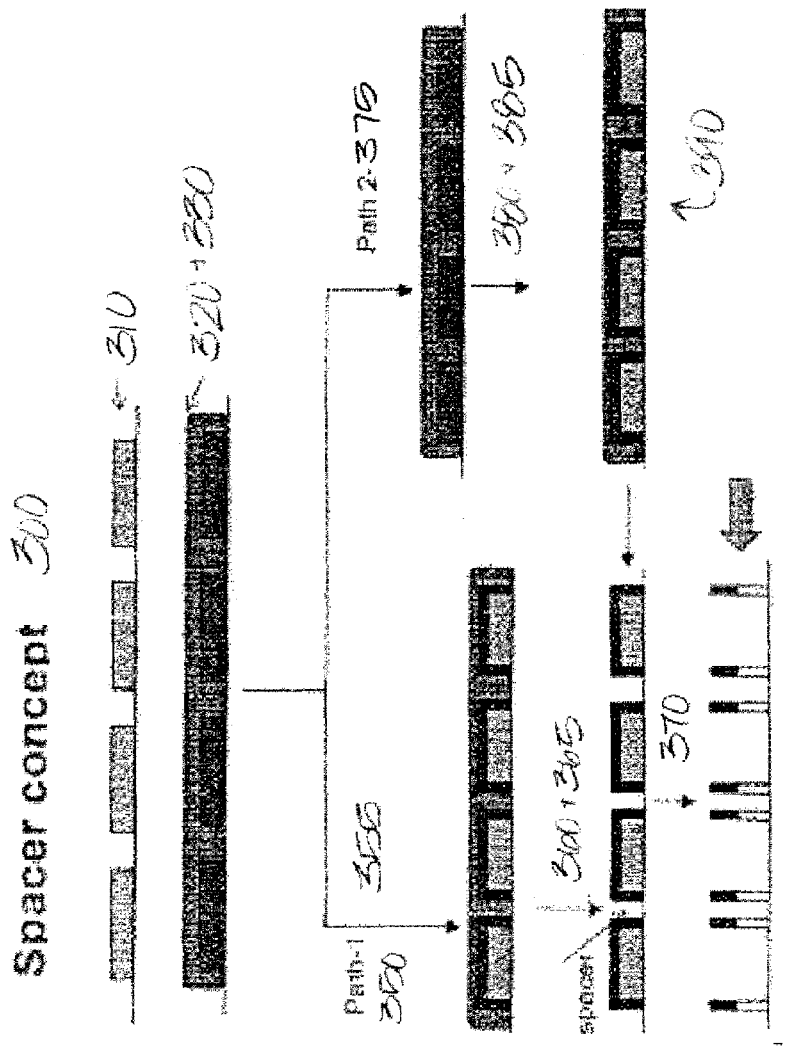

Contemplated polymer formulations, as disclosed earlier, can be utilized in any suitable application where a sacrificial or permanent layer of material is needed. For example, materials may be utilized in imprint lithography/negative tone photoimageable dielectrics, modulation of refractive index (RI)—from low to high—including reactions with nanoparticles, UV curable materials, low temperature flexible display dielectric applications, low temperature inkjet formulations, and adhesive applications such as 3D wafer bonding, and sacrificial dielectrics in MEMS based devices. Two of the applications of contemplated materials are shown in FIG. 3 (spacer concept) and FIG. 4 (glass resist concept) using inorganic polymeric materials. In FIG. 3, the spacer concept 300 is shown for two paths 350 and 375. A patterned photoresist 310 is provided. A spin-on formulation containing an acid-reactive or acid-activated crosslinking agent 320 is applied. An optional low temperature bake 330 is done to remove the solvent. In path 1 350, the photoresist 310 is heated to produce acid from the photoacid generators in the photoresist, where the acid diffuses into the formulation enabling crosslinking 355. The solvent is stripped 360 and the unreacted formulation and crosslinker is removed 365. The layered material is then etched/pattern transferred 370. In path 2 375, the curing step where light is used to cure generates acid photochemically 380. The material is then baked to diffuse the acid into the formulation 385. The pitch is reduced relative to the photoresist pattern and the spacer can either be removed or left for subsequent processing 390. The layered material is then etched/pattern transferred 370.

Figure 4:
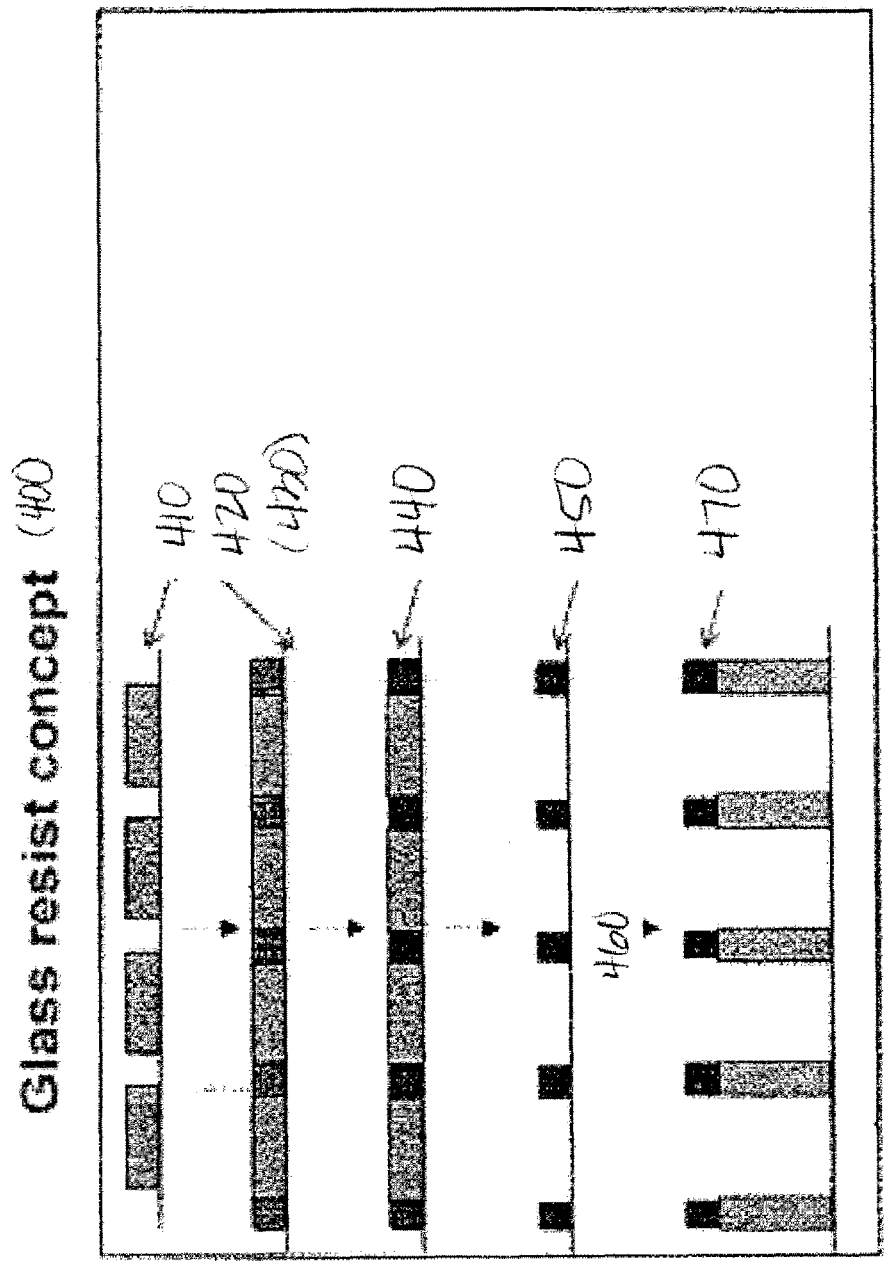
FIG. 4A shows Table 1, which shows solvent resistance data for a contemplated organic polymer formulation as a function of bake temperature.

In FIG. 4, the glass resist concept 400 is shown. A contemplated formulation 420 is applied to a patterned photoresist 410, which is some cases may be accomplished by spin-on techniques. An optional low temperature bake 430 may be conducted to remove the solvent (not shown). The heat causes the acid to react with the polymer and acid-activated crosslinker to form an insoluble material 440. A strip/ash resist to form a glass resist out of $SiO_2$ based material step is performed 450. The etch/pattern is transferred into the underlayer 460, where it can be used for image reversal or negative tone 470.

In another contemplated application, polymer formulations can be used for sliders for giant magnetoresistive (GMR) magnetic heads and sensors. In this case, very deep (>400 μm) trenches for sliders need to be filled in a GMR head application. The material utilized (in this case the polymer formulations) needs to planarize so that lithography can be performed over the top of it. Eventually, the planarizing material is all etched away (sacrificial). This material could be used in other sacrificial applications such as MEMs where planarity is important for lithography as well.

EXAMPLES

Experimental

Film Formation and Characterization

Dielectric formulations were formulated in organic solvents (typically PGMEA), filtered through 0.2 μm PTFE filters and spin-coated on to silicon or glass wafers. Films were hotplate baked at various temperatures from 140 to 200° C. for 60-90 seconds. After the post-apply bake (PAB), there is no need to do an additional thermal cure. This rapid processing for films is ideal for high throughput flexible applications such as smart cards.

Film thickness was measured after bake using n&k analyzer Model 1200 or a Thermawave® to calculate the film thickness. Refractive index (RI) of the film was measured after bake and after cure. Thermal stability was measured using thermal gravimetric analysis (TGA) to determine the weight loss associated with various thermal processing. Thermal Desorption Mass Spectroscopy (TDMS) was used to determine the identity of the volatiles as well as the total level of volatiles with the wafer maintained at cure temperature. Standard dry etch recipes were used to determine the etch rates and selectivity of the dielectric films.

Example 1

Polymer Formulation Film Bake Studies: Crosslinking Temperature

In this example and shown in Table 1, one coating of a contemplated polymer formulation is spin-coated at 1500 RPM on a surface and baked at different temperatures for 60 seconds. The films are tested for their solvent resistance by determining film thickness loss and percentage film retention (% retention). The solvent used for these studies is PGMEA. The polymer molecular weight increase because of substantive cross-linking begins to occur at a 80 C bake with complete cross-linking established by 120 C. It is observed in these studies that the minimum film bake temperature to support the above-coated film is 130 C for complete crosslinking.

Contemplated spin-coat recipes are shown in Table 2. A 1000 RPM substrate surface pre-wet can be applied prior to polymer deposition. It is recommended in some embodiments to use PGMEA, OK73, and ethyl lactate as pre-wet solvents. OK73 is an organic solvent often used for edge bead removal manufactured by TOKYO OHKA KOGYO CO., LTD, which contains propylene glycol monomethyl ether (PGME) and propylene glycol monomethyl ether acetate (PGMEA) in a ratio of 3:7.

In the coat and bake process, a single step bake is 60-90 seconds per plate. The minimum bake temperature is 140 C, where the film is crosslinked at about 130 C. The maximum bake temperature appears to be about 300 C with thermal degradation occurring around 275 C. For a two-step baking process, bake 1 is at about 100 C and bake 2 is about 140-300 C for 60-90 seconds each. In each of these instances, the maximum or final bake temperature is dictated by the temperature of subsequent film coatings and/or process steps.

The final bake temperature of contemplated organic polymer formulations ideally should be equivalent to or exceed that of any further thermal processing steps.

The baking ambient environment can be either nitrogen or clean dry air. Nitrogen is preferred for organic polymers because it preserves transparency in the visible spectrum at bake temperatures greater than 200 C, which will be shown in later examples. Dry air is serviceable, but at baking temperatures greater than 200 C, a significant loss of transparency occurs for the organic polymers.

Example 2

Polymer Formulation; Film and Planarity Studies: Single Layer

Contemplated formulations are utilized to form films in several ways. In this example, one coat of a contemplated polymer formulation is spin-coated at 1500 RPM on a patterned surface in which the depth of the via is ~500 nm while the minimum opening is pinched to 83 nm producing an aspect ratio of 6:1 and baked at 200 C for 60 seconds.

Scanning electron microscopic observations after the baking step show that the film has excellent via fill properties and excellent planarity of the via hole array topography with a film thickness of about 270 nm on a blanket film. Complete fill was observed free of voiding or bridging using this challenging substrate. Dual bakes (for example 80/200) can be used to enhance flow for substrates with narrower orifices that might bridge (fail to fill) if the high temperature 200° C. bake was used directly.

Example 3

Polymer Formulation; Film and Planarity Studies: Multiple Layer

Contemplated formulations are utilized to form films in several ways. In this example, a first coat of a contemplated polymer formulation is spin-coated at 1500 RPM on a silicon wafer and baked at 140 C for 60 seconds. The thickness of this first coating is 19090 Å. A second coating of the same contemplated polymer formulation is spin-coated at 1500 RPM and baked at 140 C for 60 seconds. The total thickness after the second coat is 38243 Å. The double coated surface is finally baked at 200 C for 60 seconds. The thickness after the final bake is 36061 Å. This method has the advantage that the diffusion of oxygen into the film after the first two bakes is much more limited than would occur for a single film deposited in one step and subsequently baked at 200° C. which should improve optical transparency for thick organic films.

Observations after the final bake show that this film exhibits excellent solvent resistance between coatings, with no interface between the two coats of polymer formulation and no significant loss of film thickness because of the second coat. Dissolution of the first coating or intermixing leading to film non-uniformity are two failure mechanisms not observed in this example. This formulation used free para-toulenesulfonic acid as the catalyst.

The significant advantage of this series is the ability to do multiple coating in which only a low temperature intermediate bake is used to provide a solvent resistant coating. FIG. 5 shows a series of sequential coatings in which the bake temperature was 135° C./60 s using three sequential hotplates for each coating. This formulation used a 35% solids organic polymeric formulation containing a thermal acid generator (TAG2713) as catalyst. The coatings were applied up to five times, and in some embodiments, more using a low viscosity formulation. The target here was to achieve a ten micron coating so this was surpassed by using five coatings.

Example 4

Thermal Stability Studies

FIGS. 6-8 show the results of three sets of thermal stability studies on contemplated organic polymer formulation films.

In FIG. 6, a contemplated polymer formulation is subjected to a single thermal ramp up to 300° C. at 10° C./min. Sample preparation: The films are coated on four inch silicon wafers and baked at low temperature (60° C. 3×120 s) in order to remove solvent and minimize increase in molecular weight. The films were then scrapped off with a razor blade and used in the appropriate thermal analysis. The polymer formulation is initially held at 25° C. for 20 minutes in a nitrogen environment. The weight loss versus temperature shows two distinct regions: a) weight loss due to PGMEA solvent evaporation and the crosslinking process and b) weight loss due to thermal decomposition of the base polymer. For the data in FIG. 6, the TGA method comprises purging nitrogen at 25° C. for 20 minutes, where it is then ramped to 300° C. at 10° C./min.

In FIG. 7, a contemplated organic polymer formulation is subjected to two independent temperature cycles up to 220° C. Again, the polymer formulation is initially held at 25° C. for 20 minutes in a nitrogen environment. The temperature is then ramped to 220° C. at 5° C./min and held at 220° C. for 5 minutes. The polymer formulation is then ramped to 25° C. at 40° C./minute. Then, the formulation is ramped to 220° C. at 5° C./minute and held at 220° C. for 5 minutes. In this embodiment, it is discovered that there is very little weight loss during the second thermal cycle.

In FIG. 8, a contemplated organic polymer formulation is subjected to two independent temperature cycles up to 300° C. Again, the polymer formulation is initially held at 25° C. for 20 minutes in a nitrogen environment. The temperature is then ramped to 300° C. at 5° C./min and held at 300° C. for 15 minutes. The polymer formulation is then ramped to 25° C. at 40° C./minute. Then, the formulation is ramped to 300° C. at 5° C./minute and held at 300° C. for 15 minutes. In this embodiment, it is discovered that there is very little weight loss during the second thermal cycle. This is important since the first thermal cycle simulates the bake (or cure) process. The second cycle simulates what an overlying film would be exposed to. Minimizing outgassing at this point averts adhesion failure or blistering.

Example 5

Optical Property Studies

FIGS. 9-12 show the results of four sets of optical property studies on contemplated polymer formulation films.

In FIG. 9, a contemplated polymer formulation is subjected to four different bake temperatures in order to determine the values of n & k at different wavelengths of light. These studies show that the polymer formulation films absorb in the UV spectrum and are transparent in the visible spectrum. Also, at bake temperatures at or above 250° C., absorption starts to occur in the visible spectrum.

In FIGS. 10 and 11, the transparency of polymer formulation films prepared at three different bake temperatures is shown. FIG. 10 shows a nitrogen bake ambient and FIG. 11 shows a dry air bake ambient. In the nitrogen environment, a greater than 90% transparency across the visible spectrum is shown. In the dry air environment, increased film yellowing occurs at temperatures greater than 200° C.

FIG. 12 shows the transparency of a contemplated organic polymer formulation film, compared to a conventional novolac-based polymer film using a 300° C. bake under nitrogen. The contemplated polymer formulation film shows improved transparency compared to the conventional film.

Example 6

Mechanical Property Studies

In this example and shown in Table 3, one coat of a contemplated organic polymer formulation is spin-coated at 1500 RPM on a surface and baked at different temperatures for 60 seconds in air. The film thickness is 2.0 µm. The films are tested for their film modulus and hardness. The properties are invariant across a wide range of bake temperatures.

Example 7

Starting Polymer Studies: Poly(Vinylphenol) Versus Novolac Resin

In this study, two different types of starting polymers are investigated for their optical transparency when baked at a relatively high temperature—250 C. The two polymers are poly(4-vinylphenol), which is also called PVP, poly(hydroxystyrene), PHS or PHOST and a cresol-based phenolic novolac resin. Specifically, this study is utilizing poly(4-vinylphenol) and CRJ-406 (a low molecular weight polymer based on ortho-cresol and formaldehyde).

Each of these starting polymers was baked at 250° C. for 60 seconds. As shown in FIG. 13, at low temperature (110° C./60 s) bakes in air, CRJ and PVP appear quite comparable in their percent transmittance (% T). When films are baked in air for 250° C./60, PVP provides higher % T than CRJ-406 at all wavelengths at comparable thickness. At some wavelengths, the increase in transmittance is as much as 25 to 35%. In addition, the optical clarity is preserved in the critical 300-700 nm visible region. FIG. 14 shows the chemical structures explaining why PVP polymers are more oxidation resistant than novolac polymers and hence more optically transparent. In this figure, the novolac oligomer structure 1410 has benzylic CH bonds that are doubly activated by two phenyl rings 1420 making them more susceptible to oxidation, and para CH bonds 1430 that are more susceptible to oxidation resulting in highly colored quinine type structures. The poly(4-vinylphenol) oligomer structure 1440 has a benzylic CH bond activated by only one phenyl ring 1450 and a para position to OH on phenol that is blocked by connection to the polymer, so it is not readily oxidized 1460. The improved transparency in this case near 248 nm is why PVP polymers are used in DUV lithograph instead of incumbent materials (novolacs) used in i-line lithography.

This temperature causes some yellowing of the novolac polymer, but the PVP shows improved transparency. This study illustrates that the PVP resin is superior to the novolac resin for optical clarity. In other words, the poly(4-vinyl) phenol has superior thermo-oxidative stability.

Example 8

Polymer Formulation Studies: Smoke Tests for Novolac-Based Polymer Formulation Versus Contemplated Polymer Formulation In this example and shown in Table 4, one coat of a novolac-based polymer formulation (conventional) and one coat of a contemplated organic polymer formulation is spin-coated on a surface and baked at different temperatures for 90 seconds in air. The film thickness is 2.0 µm. The films are tested as to whether they smoke and to what degree these films smoke or outgas.

The films are visually inspected during the baking process and the duration (in seconds) of any outgassing is noted. This test is a qualitative test in which the extent of sublimation is segmented into low, medium or high.

Essentially there is no sublimation for the novolac-based formulation at temperatures less than 200 C with light/medium volatilization at temperatures greater than 200 C. For the contemplated polymer formulation, no smoke or sublimation was observed at temperatures as high as 270 C. This is important as minimizing sublimation of volatiles prevents condensation on hotplates and re-deposition on subsequent wafers as defects.

Example 9

Crosslinker Studies

In this study, several different types of crosslinkers were investigated for transparency characteristics. Each class of crosslinker appears to provide low temperature crosslinking that occurs in the 125-135 C temperature regime (60 seconds on a hotplate). FIG. 15 shows the results of this study. The glycoluril crosslinker provides an improvement in optical transparency relative to not using any crosslinker, which is the case in the conventional novolac polymer cases mentioned throughout this disclosure. The urea-formaldehyde (C), benzoguanamine-formaldehyde (B), melamine-formaldehyde (A) crosslinkers appear to provide superior transparency in the low wavelength region between 250-425 nm than the glycoluril-formaldehyde crosslinker (D). The urea-formaldehyde formulation had some limitation in that the solubility in PGMEA was not as high as the other materials and dilution with PGMEA caused some material to come out of solution which made this crosslinker less useful than the others for this solvent system.

Example 10

Film Formation

The most critical parameter to control for these films is to make them compatible with all subsequent processing steps. In most applications, this means lithographic patterning in order to eventually transfer the pattern from the photoresist to the underlayer. Therefore these organic dielectric films must not dissolve or intermix when photoresist is applied. In order to emulate the photoresist patterning process, after the post-apply bake, PGMEA is puddled on the film for 60 sec and then spun dry. Film thickness is measured after the PAB and again after the attempted solvent strip. FIG. 16 demonstrates the solvent resistance of a contemplated organic polymeric film when utilizing different crosslinkers. It was shown that each of the crosslinkers function properly at about the same temperature. In this figure, 1170=tetrabutoxyglycoluril; U-65=a urea formaldehyde crosslinker; 1123=a benzoguanamine formaldehyde crosslinker; and 303 LF=a melamine formaldehyde crosslinker.

FIG. 17 demonstrates the solvent resistance as a function of bake temperature for two formulations using catalysts that activate at different temperatures. The low temperature crosslinking (LTC) formulation uses TAG2713 while the high temperature crosslinking (HTC) formulation uses TAG2690 from King Industries. The acids generated from these thermal acid generators vary considerably in their pKa. TAG2713 produces para-toulenesulfonic acid while TAG2690 produces triflic acid upon activation of the latent or blocked acid catalysts.

Different organic polymeric formulations have been designed for different temperature regimes. Although this concept is described below for organic systems it also applies to contemplated inorganic polymeric formulations. One is designed for high temperature crosslinking in the region of 185 to 200° C., designated HTC. The other, LTC demonstrates crosslinking in the range of 140-150° C. The formulation containing free acid shows the lowest temperature crosslinking, but is limited in terms of formulation storage stability. The sharp onset temperatures for crosslinking permit only polymer reflow to occur when baked at temperatures below the onset temperature without the complication of increasing molecular weight. However, these materials reflow and accomplish effective gap-fill even when baked at temperatures above the crosslinking temperature indicating that polymer reflow is rapid relative to crosslinking.

There are distinct advantages for each system. The HTC formulation does not crosslink until higher temperature which permits a greater degree of reflow to occur before the molecular weight increases to the point of generating a solvent resistant network. The LTC formulation has the advantage that it is compatible with temperature sensitive substrates. These formulations are identical except for the catalyst used.

FIG. 18 demonstrates the average difference in step height from a field area to an array of dense trenches. The CD of the trenches for this data set ranges from 0.22 µm up to 6 µm. This step height difference is measured using a high resolution profilometer. The different materials represent a wide range of planarization capabilities for organic polymeric systems. The best planarization occurs for the no catalyst sample, however, it has the disadvantage that solvent resistance does not occur until approximately 250° C. At 250° C., the film darkens due to a significant amount of competitive oxidation that takes place. The worst planarization (in this set) is from the material designated as the initial formulation, which uses free para-toulenesulfonic acid as catalyst. It demonstrates low temperature crosslinking but has limited shelf-life which will be highlighted in FIG. 19. The LTC formulation shows a step height approximately half the size of the initial formulation while the HTC shows a 50% improvement in semiglobal planarization relative to the LTC. Furthermore, the HTC demonstrates nearly the same level of planarization as the no catalyst system while maintaining optical transparency.

Formulation design—The formulation is designed using materials known to be acceptable in the microelectronics industry. They are compatible with the process tools, have good spin-bowl compatibility with photoresist tracks and demonstrate low metal or ionic content using environmentally acceptable solvents. FIG. 13 demonstrates the shelf life of the LTC formulation. There is no molecular weight growth even after ~90 days of exposure to 40° C. The stabilization of the formulation is remarkable in that the relative molecular weight does not change in this accelerated aging test while the initial formulation (with free para-toulenesulfonic acid) shows an order of magnitude increase in molecular weight.

Dry Etching:

These organic films are readily etched using an oxygen based plasma (1000 W, 20 mT, $O_2/N_2$ 30 sccm/120 sccm) using a TEL Unity II, model U2e-855DD etcher. The experimental etch rate was 6119 Å/min with a 62:1 selectivity to thermal oxide. This implies that the material has excellent etch characteristics for use as an underlayer in trilayer lithography with overlying high Si content BARCs or hard masks The percent transmittance of the films deposited on glass substrates is plotted in FIG. 20. The films are spin coated at 1500 rpm and post apply baked at 180° C. for 60 sec. The glass blank is shown along with the LTC formulation. The salient features are transparency that ranges from 96-97% relative to the glass reference from 380 to 700 nm for the LTC formulation that crosslinks at 140° C. This example is the full spectrum of the data shown in FIG. 15 and the formulations are the same (LTC is formulation D in FIG. 15 that demonstrated the enhanced transmittance of the urea-formaldehyde, melamine-formaldehyde and benzoguanamine-formaldehyde crosslinkers relative to tetrabutoxyglycoluril)

A major limitation of any of these organic materials is the undesired oxidation in air at high temperature. Oxidation of the polymeric film results in a decrease in the transmittance of light in the visible portion of the electromagnetic spectrum. Second generation materials are being developed that show improved resistance to oxidation at high temperature that are based on more oxidation resistant organic as well as contemplated inorganic polymeric formulations. The contemplated inorganic polymeric formulations show an improvement in oxidative stability that produces an improvement in the optical transparency of the film as well.

Example 11

Production of a Contemplated Formulation

In these formulations, non-volatile components are treated as solids. Therefore, polymer, acid, crosslinker and surfactant (optionally) are considered as solids and are included in the calculated % solids. The base polymer is the dependent variable with the crosslinker and acid concentrations determined experimentally. The quantity of polymer is then calculated to make up the remainder of the solids in the formulation. A representative formulation spreadsheet is shown in Table 5.

The formulation size and target percentage of solids is inputed. The concentration column refers to whether the material is a solid (100% concentration) or a solution in solvent (usually PGMEA). Small differences in calculated solids (20.668) and the total solids (20.574) are because of the presence of water in para-toulenesulfonate monohydrate in which the water is not included as a solid. The order of addition may or may not be important depending on the specific formulation, but typically the organic polymer (CRJ406) solution is charged followed by the crosslinker (powderlink 1170) followed by the acid (5% p-TSA in PGMEA), surfactant (1% BYK307 in PGMEA) and finally sufficient additional PGMEA is added so that the target percentage (%) solids of the formulation is achieved. The target concentration column refers to the percentages of each component in the theoretical solid film in which all solvent has been removed.

Example 12

Optimization of the Level of TAG2713 (Generates Para-Toulenesulfonic Acid)

In order to optimize the level of thermal acid generator present in the formulation, two factors are important. The first is to determine at what level the TAG concentration becomes insufficient to provide solvent resistance and then to choose a position on the plateau of the saturation curve that permits small errors in mischarging weighing to be insignificant on the performance.

In this example, the film thickness is approximately 4000 Å for each formulation after PAB. After bake, the films are puddled with PGMEA in an attempt to dissolve them. As the level of TAG is lowered, eventually there is insufficient acid generated to crosslink the entire film resulting in a thinner film. The bake temperature was 150° C. for 60 s (using TAG2713), well above the minimum crosslinking temperature of 140° C. As shown in FIG. 21, even at 0.125% TAG, the film has some solvent resistance. At 0.25% the solvent resistance is essentially complete. Choosing a target level of 1% TAG for this formulation permits a robust formulation that can be readily crosslinked where small errors in charging are insignificant to the film performance.

Example 13

The PTS-Series

Silsequioxane resins are useful in that they provide extremely transparent high quality coatings that are stable at high temperature with minimal outgassing. Among the limitations of these systems is the requirement to use higher temperature cures in order to make the materials solvent resistant for the subsequent processing steps. A second limitation not relevant to low temperature processing is the presence of polar silanol groups in the film due to incomplete cure. The ability to react these materials with crosslinkers is thought to produce superior electrical properties.

In this example, the first issue is to determine the percentage of TAG required. FIG. 22 shows a example designed to determine the onset temperature for crosslinking using high levels of TAG so that it is not limiting. Three different levels of TAG (2.5, 1.25, 0.65%) are shown and each shows nearly identical behavior with little differentiation using the evaluation range temperatures (120, 160, 200° C.). This demonstrates that the combination of glycoluril crosslinker and TAG produce a solvent resistant network with the inorganic polymers which otherwise dissolve in PGMEA without them using these bake conditions. It also demonstrates that 120° C. is not sufficient to crosslink (below activation temperature of TAG) and that the film is completely crosslinked by 160° C.

FIG. 23 shows the determination of the minimal level of TAG needed to obtain a crosslinked film. In many cases, the polymer itself has excellent properties and is only lacking in one or two key properties (such as low temperature solvent resistance). Therefore, it is sometimes advantageous to minimize the levels of formulation components added. At levels of TAG (above 0.25%), the response saturates at a plateau level. However as the level of TAG is decreased, eventually the curvature of the response indicates that insufficient acid is present to complete crosslinking. In spite of this downward trend, 90% of the film is still crosslinked when the TAG level is decreased by about a factor of ten from the maximum level of 0.65% in FIG. 23.

FIGS. 22 and 23 demonstrate that the films show solvent resistance at 160° C.—a temperature where the polymer without the TAG shows complete solubility with or without the crosslinker in the absence of a source of acid. Furthermore, these figures show that lower concentrations of TAG (0.25%) display essentially complete solvent resistance. The acid generated here is DNNSA (dinonylnapthalene sulfonic acid)

Other factors besides low temperature crosslinking become critical depending on the application. For example, a material that crosslinks at a low temperature increases in molecular weight and does not planarize or flow as well as the polymer that crosslinks at higher temperature. In this case, the selection of a thermal acid generator that crosslinks at higher temperature permits the use of a higher range of temperatures to permit polymer reflow prior to crosslinking. In FIG. 24, TAG 2690, which generates triflic acid upon thermal activation, crosslinks the contemplated inorganic polymeric film between 170 and 175° C., which in turn permits the temperatures below 170° C. to be used for reflow only and the ramp up to these temperatures to be used to promote polymer reflow before building molecular weight.

FIG. 25 demonstrate that molecular weight does not increase for this system significantly as shown by GPC data even at temperatures up to 180 where the film is completely insoluble in PGMEA as shown in FIG. 24. In this experiment, similar films as above were spun at each temperature and removed with a razor blade (after bake) and dissolved in tetrahydrofuran, filtered and characterized by size exclusion chromatography. This demonstrates yet another advantage of these systems. Even though they are completely insoluble in PGMEA permitting subsequent processing, they can be dissolved in tetrahydrofuran indicating that they may be able to be stripped if needed (due to defects or other problems) permitting rework of an high value added substrate using an appropriate stripping solution. FIG. 19 also demonstrates that the polymer matrix does have an effect on the temperature at which the TAG activates. For the organic polymer (FIG. 11) the temperature using TAG2690 and organic polymer was 185° C. for complete crosslinking while for the inorganic polymer, using a longer 120 s bake, the temperature is 175° C. (10° C. lower).

The sample baked at 180° C. shown in FIG. 25, showed significant quantity of insolubles so the GPC did not sample the entire molecular weight distribution since some of the material had gelled and was removed by the filtration process. However, all the other samples were completely soluble and filtered readily. These materials showed minimal molecular weight change after bake. This indicates that they will retain their flow characteristics right up until the temperature which activates the TAG and the acid catalyzed crosslinking.

In contrast, the free acid version of the contemplated organic polymeric formulation shows a sharp rise in Mw prior to gellation (FIG. 26). In this case, the samples that had gels were excluded from the analysis (not on the graph), but the sharp increase in Mw is observed with bake temperature (over 10× increase with bake temperature) which should inhibit the flow of the material. Significantly, all of these materials were readily soluble in THF solvent and filtered readily indicating that this is a powerful methodology for observing extent of reaction and planarization capabilities.

Experimental

A series of 100 gram solutions were prepared at 20% total solids in the following manner, and the recipes are shown below in Table 6. 33.857 g of CRJ-406-40 (SI Group, 40.34% solids in PGMEA) was used in a formulation in conjunction with a 12.245 g of a 50.16% solution Cymel 1170 (Cytec Industries) in PGMEA. 0.8 g of a 25% solution of TAG2713 in 1-methoxy-2-propanol (PGME) (King Industries) was added followed by 1.429 g of a 10% solution of FC4430 (3M Corporation) in a 54:36 solvent blend of isopropanol:PGMEA. The formulation was diluted to the target solids loading with 53.098 g of PGMEA (General Chemical).

The quantity of Cymel 1170 used in the formulation corresponds to 0.256 equivalents. This value was used to calculate the equivalent weight % targets for the crosslinkers in the other formulations below. In all cases, the quantity of thermal acid generator was constant and the quantity of polymer was adjusted so that the total solids content was 20%.

Performance Testing.

The films were coated using on an SVG spin coater using 4 inch substrates (silicon, or glass for UV-VIS studies). The solutions were dispensed statically and then spun at 500 rpm for 5 s followed by 1500 rpm for 30 s. The post-apply bake was done at various temperatures for 60 s and the film thickness was measured. The solvent resistance was tested by puddling PGMEA on the wafer for 60 s followed by spinning off the solvent and drying it at 3000 rpm for 30 s. The film thickness was measured after this process and the % film retention was calculated. In some cases, the film retention exceeds 100% indicating that some swelling of the polymeric film has occurred, as shown in FIG. 27. Each of these crosslinkers function to produce low temperature crosslinking at 125-135° C. indicating all are effective.

In order to ensure that the absorbance of the films is less than 1 (ie >10% transmittance), thinner films are required and for these studies, additional PGMEA was used to dilute the above formulations to 5% total solids and a film thickness of ~1000 Å resulted when spin coated at 1500 rpm and baked at 180° C. for 60 s. The transmittance data in FIG. 15 shows that the other crosslinkers (melamine/benzoguanamine/urea-formaldehyde crosslinkers) have superior optical transmittance in the 250-425 nm range than the tetrabutoxyglycoluril crosslinker (D).

Example 14

Preparation of Co-Polymers Using Organic and Inorganic Mixtures to Modulate RI

Formulations were made as described in Example 12 at 20% total solids in which one formulation contained the same organic polymer as in Example 12. The other formulation used a different polymer (GR-150 F from Techniglass, OH). Both formulations were filtered through 0.2 µm filters and mixtures of the two were made by admixing the formulations in different proportions based on weight. The films were spin coated on a SUSS spin coater using a spin speed of 1000 rpm. A dual bake was performed at 160° C. for 60 s followed by 170° C. for 60 s. Film thickness and refractive index were determined after bake and after a 250° C. cure for 60 min inside a forced air convection oven. The refractive index of the solvent resistant material (after bake) demonstrated an excellent linear relationship between refractive index and composition (expressed as % organic). The relationship after cure follows the same trends, as shown in Table 7 and FIGS. 28 and 29.

This data demonstrates another use of these materials, and this approach permits making films that can be made in whatever composition is desired from one extreme to another by admixing pure formulations containing one polymer or another without the need for making co-polymers. In addition to modulating the refractive index of these materials, the plasma etch rate will also be tunable by selecting the relative proportion of inorganic to organic in the formulation.

Thus, specific embodiments, methods of processable inorganic and organic polymer formulations, methods of production and uses thereof have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A polymer composition, comprising:
    a copolymer of methyl/phenyl silsesquioxane including silanol functional groups;
    at least one solvent;
    at least one acid-activated crosslinker; and
    at least one acid source, wherein said at least one acid source is a thermal acid generator capable of producing para-toluenesulfonic acid.

2. The polymer composition of claim 1, wherein the at least one acid-activated crosslinker comprises an alkoxyglycoluril, benzoguanamine, melamine or urea with multiple alkylol groups.

3. The polymer composition of claim 1, further comprising a surfactant.

4. A transparent film formed from the polymer composition of claim 1.

5. The polymer composition of claim 1, further comprising at least one silicon-containing surfactant.

6. The polymer composition of claim 1, further comprising at least one organic surfactant.

7. The polymer composition of claim 1, wherein said at least one acid-activated crosslinker is tetrabutoxyglycouril.

8. The polymer composition of claim 1, wherein said at least one solvent comprises polyethylene glycol monomethyl ether acetate (PGMEA).

9. The polymer composition of claim 1, wherein said composition is cross-linkable at a temperature of 160-200° C.

10. A polymer composition, comprising:
    a copolymer of methyl/phenyl silsesquioxane including silanol functional groups;
    at least one acid source selected from the group of thermal acid generators;
    at least one solvent; and
    at least one acid-activated crosslinker that reacts with the siloxane polymer, wherein the at least one acid-activated crosslinker comprises glycoluril, an alkoxyglycoluril, urea with multiple alkylol groups or a combination thereof.

11. The polymer composition of claim 10, wherein the formulation is curable at a low temperature.

12. A transparent film formed from the polymer composition of claim 10.

13. The polymer of claim 10, further comprising a surfactant.

14. The polymer composition of claim 10, wherein at least one acid source is a thermal acid generator capable of producing para-toluenesulfonic acid.

15. The polymer composition of claim 10, wherein the at least one acid activated crosslinker is selected from the group consisting of tetramethoxyglycoluril and tetrabutoxyglycoluril.

16. The polymer composition of claim 10, further comprising at least one silicon-containing surfactant.

17. The polymer composition of claim 10, further comprising at least one organic surfactant.

18. The polymer composition of claim 10, wherein said at least one acid-activated crosslinker is tetrabutoxyglycouril.

19. The polymer composition of claim 10, wherein said at least one solvent comprises polyethylene glycol monomethyl ether acetate (PGMEA).

20. The polymer composition of claim 1, wherein said composition is cross-linkable at a temperature of 160-200° C.

* * * * *